US008799353B2

(12) United States Patent
Larsson et al.

(10) Patent No.: US 8,799,353 B2
(45) Date of Patent: Aug. 5, 2014

(54) SCOPE-BASED EXTENSIBILITY FOR CONTROL SURFACES

(76) Inventors: Josef Larsson, Des Moines, WA (US); Timothy P. McConnell, Kirkland, WA (US); Elisabeth K. Olson, Bellevue, WA (US); Dean J. Justus, Monroe, WA (US)

(*) Notice: Subject to any disclaimer, the term of this patent is extended or adjusted under 35 U.S.C. 154(b) by 330 days.

(21) Appl. No.: 12/414,317

(22) Filed: Mar. 30, 2009

(65) Prior Publication Data
US 2010/0250649 A1    Sep. 30, 2010

(51) Int. Cl.
*G06F 15/16*    (2006.01)
(52) U.S. Cl.
USPC ............ 709/203; 709/217; 709/218; 709/219
(58) Field of Classification Search
USPC ..................... 709/203, 217–219; 711/100
See application file for complete search history.

(56) References Cited

U.S. PATENT DOCUMENTS

| | | | |
|---|---|---|---|
| 5,155,806 A | 10/1992 | Hoeber et al. |
| 5,377,354 A | 12/1994 | Scannell et al. |
| 5,500,936 A | 3/1996 | Allen et al. |
| 5,519,606 A | 5/1996 | Frid-Nielsen et al. |
| 5,533,184 A | 7/1996 | Malcolm et al. |
| 5,559,944 A | 9/1996 | Ono |
| 5,570,109 A | 10/1996 | Jenson |
| 5,588,107 A | 12/1996 | Bowden et al. |
| 5,596,694 A | 1/1997 | Capps |
| 5,625,783 A | 4/1997 | Ezekiel et al. |
| 5,634,100 A | 5/1997 | Capps |
| 5,634,128 A | 5/1997 | Messina |
| 5,638,504 A | 6/1997 | Scott et al. |
| 5,644,737 A | 7/1997 | Tuniman et al. |
| 5,659,693 A | 8/1997 | Hansen et al. |
| 5,664,127 A | 9/1997 | Anderson et al. |
| 5,664,208 A | 9/1997 | Pavley et al. |
| 5,673,403 A | 9/1997 | Brown |
| 5,721,847 A | 2/1998 | Johnson |

(Continued)

FOREIGN PATENT DOCUMENTS

| | | |
|---|---|---|
| CN | 101243439 B | 6/2012 |
| EP | 1 077 405 A2 | 2/2001 |

(Continued)

OTHER PUBLICATIONS

Clifton, Marc; The Application Automation Layer—Using XML to Dynamically Generate GUI-Elements—Forms and Controls, Copyright 2003, 37 pages.

(Continued)

*Primary Examiner* — Umar Cheema

(57) ABSTRACT

A server computing system stores a base definition file containing a hierarchy of elements defining a default control surface. In addition, the server computing system stores an extension definition file containing one or more elements defining a customized control surface based on the default control surface. The server computing system generates a modified version of the base definition file in which each element in the base definition file having an identifier corresponding to an identifier of an element in the extension definition file is modified in a way indicated by the element in the extension definition file. The server computing system uses the modified version of the base definition file to generate a resource used by a client computing system to present the customized control surface in a web page.

18 Claims, 8 Drawing Sheets

(56) References Cited

U.S. PATENT DOCUMENTS

| | | |
|---|---|---|
| 5,734,915 A | 3/1998 | Roewer |
| 5,760,768 A | 6/1998 | Gram |
| 5,760,773 A | 6/1998 | Berman et al. |
| 5,761,646 A | 6/1998 | Frid-Nielsen et al. |
| 5,778,402 A | 7/1998 | Gipson |
| 5,778,404 A | 7/1998 | Capps et al. |
| 5,796,393 A | 8/1998 | MacNaughton et al. |
| 5,805,167 A | 9/1998 | van Cruyningen |
| 5,812,132 A | 9/1998 | Goldstein |
| 5,821,936 A | 10/1998 | Shaffer et al. |
| 5,828,376 A | 10/1998 | Solimene et al. |
| 5,838,321 A | 11/1998 | Wolf |
| 5,842,009 A | 11/1998 | Borovoy et al. |
| 5,844,558 A | 12/1998 | Kumar et al. |
| 5,844,572 A | 12/1998 | Schott |
| 5,855,006 A | 12/1998 | Huemoeller et al. |
| 5,885,006 A | 3/1999 | Sheedy |
| 5,893,125 A | 4/1999 | Shostak |
| 5,898,436 A | 4/1999 | Stewart et al. |
| 5,899,979 A | 5/1999 | Miller et al. |
| 5,905,863 A | 5/1999 | Knowles et al. |
| 5,914,714 A | 6/1999 | Brown |
| 5,926,806 A | 7/1999 | Marshall et al. |
| 5,936,625 A | 8/1999 | Kahl et al. |
| 5,940,078 A | 8/1999 | Nagarajayya et al. |
| 5,940,847 A | 8/1999 | Fein et al. |
| 5,943,051 A | 8/1999 | Onda et al. |
| 5,960,406 A | 9/1999 | Rasansky et al. |
| 5,970,466 A | 10/1999 | Detjen et al. |
| 5,999,938 A | 12/1999 | Bliss et al. |
| 6,002,395 A | 12/1999 | Wagner et al. |
| 6,008,806 A | 12/1999 | Nakajima et al. |
| 6,012,075 A | 1/2000 | Fein et al. |
| 6,018,343 A | 1/2000 | Wang et al. |
| 6,034,683 A | 3/2000 | Mansour et al. |
| 6,067,087 A | 5/2000 | Krauss et al. |
| 6,072,492 A | 6/2000 | Schagen et al. |
| 6,085,206 A | 7/2000 | Domini et al. |
| 6,101,480 A | 8/2000 | Conmy et al. |
| 6,133,915 A | 10/2000 | Arcuri et al. |
| 6,175,363 B1 | 1/2001 | Williams et al. |
| 6,188,401 B1 | 2/2001 | Peyer |
| 6,188,403 B1 | 2/2001 | Sacerdoti et al. |
| 6,192,381 B1 | 2/2001 | Stiegemeier et al. |
| 6,211,879 B1 | 4/2001 | Soohoo |
| 6,216,122 B1 | 4/2001 | Elson |
| 6,219,670 B1 | 4/2001 | Mocek et al. |
| 6,222,540 B1 | 4/2001 | Sacerdoti |
| 6,230,309 B1 | 5/2001 | Turner et al. |
| 6,232,971 B1 | 5/2001 | Haynes |
| 6,236,396 B1 | 5/2001 | Jenson et al. |
| 6,256,628 B1 | 7/2001 | Dobson et al. |
| 6,278,450 B1 | 8/2001 | Arcuri et al. |
| 6,289,317 B1 | 9/2001 | Peterson |
| 6,307,544 B1 | 10/2001 | Harding |
| 6,323,883 B1 | 11/2001 | Minoura et al. |
| 6,353,451 B1 | 3/2002 | Teibel et al. |
| 6,359,634 B1 | 3/2002 | Cragun et al. |
| 6,373,507 B1 | 4/2002 | Camara et al. |
| 6,384,849 B1 | 5/2002 | Morcos et al. |
| 6,405,216 B1 | 6/2002 | Minnaert et al. |
| 6,424,829 B1 | 7/2002 | Kraft |
| 6,429,882 B1 | 8/2002 | Abdelnur et al. |
| 6,433,801 B1 | 8/2002 | Moon et al. |
| 6,433,831 B1 | 8/2002 | Dinwiddie |
| 6,456,304 B1 | 9/2002 | Angiulo et al. |
| 6,459,441 B1 | 10/2002 | Perroux et al. |
| 6,466,236 B1 | 10/2002 | Pivowar et al. |
| 6,469,722 B1 | 10/2002 | Kineo et al. |
| 6,480,865 B1 | 11/2002 | Lee et al. |
| 6,493,006 B1 | 12/2002 | Gourdol et al. |
| 6,493,731 B1 | 12/2002 | Jones et al. |
| 6,546,417 B1 | 4/2003 | Baker |
| 6,564,377 B1 | 5/2003 | Jayasimha et al. |
| 6,570,596 B2 | 5/2003 | Frederiksen |
| 6,578,192 B1 | 6/2003 | Boehme et al. |
| 6,583,798 B1 | 6/2003 | Hoek et al. |
| 6,618,732 B1 | 9/2003 | White et al. |
| 6,621,504 B1 | 9/2003 | Nadas et al. |
| 6,621,508 B1 | 9/2003 | Shiraishi et al. |
| 6,624,831 B1 | 9/2003 | Shahine et al. |
| 6,635,089 B1 | 10/2003 | Burkett et al. |
| 6,664,983 B2 | 12/2003 | Ludolph |
| 6,680,749 B1 | 1/2004 | Anderson et al. |
| 6,686,938 B1 | 2/2004 | Jobs et al. |
| 6,691,281 B1 | 2/2004 | Sorge et al. |
| 6,708,205 B2 | 3/2004 | Sheldon et al. |
| 6,727,919 B1 | 4/2004 | Reder et al. |
| 6,732,330 B1 | 5/2004 | Claussen et al. |
| 6,734,880 B2 | 5/2004 | Chang et al. |
| 6,750,890 B1 | 6/2004 | Sugimoto |
| 6,778,990 B2 | 8/2004 | Garcia et al. |
| 6,785,868 B1 | 8/2004 | Raff |
| 6,825,859 B1 | 11/2004 | Severenuk et al. |
| 6,826,729 B1 | 11/2004 | Giesen et al. |
| 6,850,255 B2 | 2/2005 | Muschetto |
| 6,857,103 B1 | 2/2005 | Wason |
| 6,871,195 B2 | 3/2005 | Ryan et al. |
| 6,882,354 B1 | 4/2005 | Nielsen |
| 6,904,449 B1 | 6/2005 | Quinones |
| 6,906,717 B2 | 6/2005 | Couckuyt et al. |
| 6,915,492 B2 | 7/2005 | Kurtenbach et al. |
| 6,924,797 B1 | 8/2005 | MacPhail |
| 6,931,623 B2 | 8/2005 | Vermeire et al. |
| 6,956,429 B1 | 10/2005 | Elbanhawy |
| 6,964,025 B2 | 11/2005 | Angiulo et al. |
| 6,983,889 B2 | 1/2006 | Alles |
| 6,988,241 B1 | 1/2006 | Guttman et al. |
| 6,990,637 B2 | 1/2006 | Anthony et al. |
| 6,990,654 B2 | 1/2006 | Carroll, Jr. |
| 7,016,864 B1 | 3/2006 | Notz et al. |
| 7,027,463 B2 | 4/2006 | Mathew et al. |
| 7,032,210 B2 | 4/2006 | Alloing et al. |
| 7,039,596 B1 | 5/2006 | Lu |
| 7,046,848 B1 | 5/2006 | Olcott |
| 7,086,006 B2 | 8/2006 | Subramanian |
| 7,093,162 B2 | 8/2006 | Barga et al. |
| 7,107,544 B1 | 9/2006 | Luke |
| 7,110,936 B2 | 9/2006 | Hiew et al. |
| 7,117,436 B1 * | 10/2006 | O'Rourke et al. ............ 715/205 |
| 7,152,207 B1 | 12/2006 | Underwood et al. |
| 7,174,361 B1 | 2/2007 | Paas |
| 7,188,073 B1 | 3/2007 | Tam et al. |
| 7,188,158 B1 | 3/2007 | Stanton et al. |
| 7,212,208 B2 | 5/2007 | Khozai |
| 7,216,301 B2 | 5/2007 | Moehrle |
| 7,218,976 B2 | 5/2007 | Minagawa |
| 7,219,305 B2 | 5/2007 | Jennings |
| 7,225,244 B2 | 5/2007 | Reynolds |
| 7,234,132 B2 | 6/2007 | Lam |
| 7,240,323 B1 | 7/2007 | Desai |
| 7,249,325 B1 | 7/2007 | Donaldson |
| 7,281,245 B2 | 10/2007 | Reynar et al. |
| 7,325,204 B2 | 1/2008 | Rogers |
| 7,328,409 B2 | 2/2008 | Awada et al. |
| 7,337,185 B2 | 2/2008 | Ellis et al. |
| 7,346,705 B2 | 3/2008 | Hullot et al. |
| 7,346,769 B2 | 3/2008 | Forlenza et al. |
| 7,356,537 B2 | 4/2008 | Reynar et al. |
| 7,360,174 B2 | 4/2008 | Grossman et al. |
| 7,386,535 B1 | 6/2008 | Kalucha et al. |
| 7,386,835 B1 | 6/2008 | Desai |
| 7,392,249 B1 | 6/2008 | Harris et al. |
| 7,395,540 B2 | 7/2008 | Rogers |
| 7,426,713 B2 | 9/2008 | Duggan et al. |
| 7,472,374 B1 | 12/2008 | Dillman et al. |
| 7,484,213 B2 | 1/2009 | Mathew et al. |
| 7,505,954 B2 | 3/2009 | Heidloff et al. |
| 7,509,628 B2 | 3/2009 | Hilerio et al. |
| 7,530,029 B2 | 5/2009 | Satterfield et al. |
| 7,567,964 B2 | 7/2009 | Brice et al. |
| 7,610,575 B2 | 10/2009 | Sproule |
| 7,627,561 B2 | 12/2009 | Pell et al. |
| 7,769,698 B2 | 8/2010 | Matic |

(56) References Cited

U.S. PATENT DOCUMENTS

| | | |
|---|---|---|
| 7,779,386 B2 * | 8/2010 | Seitz et al. .................... 717/108 |
| 7,827,546 B1 | 11/2010 | Jones et al. |
| 7,860,901 B2 | 12/2010 | Cheng et al. |
| 7,886,290 B2 | 2/2011 | Dhanjal et al. |
| 7,908,580 B2 | 3/2011 | Stubbs et al. |
| 7,925,621 B2 | 4/2011 | Sikchi et al. |
| 7,949,963 B1 | 5/2011 | Pham et al. |
| 8,046,683 B2 | 10/2011 | Larcheveque et al. |
| 8,239,882 B2 | 8/2012 | Dhanjal et al. |
| 8,302,014 B2 | 10/2012 | Guadarrama et al. |
| 2002/0007380 A1 | 1/2002 | Bauchot et al. |
| 2002/0036662 A1 | 3/2002 | Gauthier et al. ............ 345/835 |
| 2002/0037754 A1 | 3/2002 | Hama et al. |
| 2002/0052721 A1 | 5/2002 | Ruff et al. |
| 2002/0070977 A1 | 6/2002 | Morcos et al. |
| 2002/0075330 A1 | 6/2002 | Rosenzweig et al. |
| 2002/0078143 A1 | 6/2002 | De Boor et al. |
| 2002/0083097 A1 | 6/2002 | Warrington |
| 2002/0091739 A1 | 7/2002 | Ferlitsch et al. |
| 2002/0122071 A1 | 9/2002 | Camara et al. |
| 2002/0133557 A1 | 9/2002 | Winarski |
| 2002/0135621 A1 | 9/2002 | Angiulo et al. |
| 2002/0140731 A1 | 10/2002 | Subramaniam et al. |
| 2002/0140740 A1 | 10/2002 | Chen |
| 2002/0149623 A1 | 10/2002 | West et al. |
| 2002/0149629 A1 | 10/2002 | Craycroft et al. |
| 2002/0154178 A1 | 10/2002 | Barnett et al. |
| 2002/0163538 A1 | 11/2002 | Shteyn |
| 2002/0175955 A1 | 11/2002 | Gourdol et al. |
| 2002/0196293 A1 | 12/2002 | Suppan et al. |
| 2003/0011638 A1 | 1/2003 | Chung |
| 2003/0011639 A1 | 1/2003 | Webb |
| 2003/0014490 A1 | 1/2003 | Bates et al. |
| 2003/0022700 A1 | 1/2003 | Wang |
| 2003/0025732 A1 | 2/2003 | Prichard |
| 2003/0035917 A1 | 2/2003 | Hyman |
| 2003/0038832 A1 | 2/2003 | Sobol |
| 2003/0043211 A1 | 3/2003 | Kremer et al. |
| 2003/0066025 A1 | 4/2003 | Garner et al. |
| 2003/0070143 A1 | 4/2003 | Maslov |
| 2003/0093490 A1 | 5/2003 | Yamamoto et al. |
| 2003/0097361 A1 | 5/2003 | Huang et al. |
| 2003/0098891 A1 | 5/2003 | Molander |
| 2003/0110191 A1 | 6/2003 | Handsaker et al. |
| 2003/0112278 A1 | 6/2003 | Driskell |
| 2003/0135825 A1 | 7/2003 | Gertner |
| 2003/0160821 A1 | 8/2003 | Yoon |
| 2003/0163455 A1 | 8/2003 | Dettinger et al. |
| 2003/0167310 A1 | 9/2003 | Moody et al. |
| 2003/0167315 A1 | 9/2003 | Chowdhry et al. |
| 2003/0169284 A1 | 9/2003 | Dettinger et al. |
| 2003/0195937 A1 | 10/2003 | Kircher et al. |
| 2003/0206646 A1 | 11/2003 | Brackett |
| 2003/0218611 A1 | 11/2003 | Ben-Tovim et al. |
| 2003/0226106 A1 | 12/2003 | McKellar et al. |
| 2003/0227481 A1 | 12/2003 | Arend et al. |
| 2003/0227487 A1 | 12/2003 | Hugh |
| 2003/0233419 A1 | 12/2003 | Beringer |
| 2004/0003351 A1 | 1/2004 | Sommerer et al. |
| 2004/0012633 A1 | 1/2004 | Helt |
| 2004/0056894 A1 | 3/2004 | Zaika et al. |
| 2004/0090315 A1 | 5/2004 | Mackjust et al. |
| 2004/0100504 A1 | 5/2004 | Sommer |
| 2004/0100505 A1 | 5/2004 | Cazier |
| 2004/0107197 A1 | 6/2004 | Shen et al. |
| 2004/0109025 A1 | 6/2004 | Hullot et al. |
| 2004/0109033 A1 | 6/2004 | Vienneau et al. |
| 2004/0117451 A1 | 6/2004 | Chung |
| 2004/0119760 A1 | 6/2004 | Grossman et al. |
| 2004/0122789 A1 | 6/2004 | Ostertag |
| 2004/0128275 A1 | 7/2004 | Moehrle |
| 2004/0133854 A1 | 7/2004 | Black |
| 2004/0142720 A1 | 7/2004 | Smethers |
| 2004/0153373 A1 | 8/2004 | Song et al. |
| 2004/0153968 A1 | 8/2004 | Ching |
| 2004/0164983 A1 | 8/2004 | Khozai |
| 2004/0168153 A1 | 8/2004 | Marvin |
| 2004/0181471 A1 | 9/2004 | Rogers |
| 2004/0186775 A1 | 9/2004 | Margiloff et al. |
| 2004/0192440 A1 | 9/2004 | Evans |
| 2004/0221234 A1 | 11/2004 | Imai |
| 2004/0230508 A1 | 11/2004 | Minnis et al. |
| 2004/0230906 A1 | 11/2004 | Pik et al. |
| 2004/0239700 A1 | 12/2004 | Baschy |
| 2004/0243938 A1 | 12/2004 | Weise et al. |
| 2004/0268231 A1 | 12/2004 | Tunning |
| 2005/0004990 A1 | 1/2005 | Durazo et al. |
| 2005/0005249 A1 | 1/2005 | Hill et al. |
| 2005/0010871 A1 | 1/2005 | Ruthfield et al. |
| 2005/0021504 A1 | 1/2005 | Atchison |
| 2005/0022116 A1 | 1/2005 | Bowman et al. |
| 2005/0039142 A1 | 2/2005 | Jalon et al. |
| 2005/0043015 A1 | 2/2005 | Muramatsu |
| 2005/0044500 A1 | 2/2005 | Orimoto et al. |
| 2005/0057584 A1 | 3/2005 | Gruen et al. |
| 2005/0086135 A1 | 4/2005 | Lu |
| 2005/0091576 A1 | 4/2005 | Relyea |
| 2005/0097511 A1 | 5/2005 | Bergman et al. |
| 2005/0117179 A1 | 6/2005 | Ito et al. |
| 2005/0138576 A1 | 6/2005 | Baumert et al. |
| 2005/0144241 A1 | 6/2005 | Stata et al. |
| 2005/0154765 A1 * | 7/2005 | Seitz et al. ................ 707/104.1 |
| 2005/0172262 A1 | 8/2005 | Lalwani |
| 2005/0183008 A1 | 8/2005 | Crider et al. |
| 2005/0203975 A1 | 9/2005 | Jindal et al. |
| 2005/0216863 A1 | 9/2005 | Schumacher et al. |
| 2005/0223329 A1 | 10/2005 | Schwartz et al. |
| 2005/0240902 A1 | 10/2005 | Bunker et al. |
| 2005/0256867 A1 | 11/2005 | Walther et al. |
| 2005/0278656 A1 | 12/2005 | Goldthwaite et al. |
| 2005/0289156 A1 | 12/2005 | Maryka et al. |
| 2006/0015816 A1 | 1/2006 | Kuehner |
| 2006/0020962 A1 | 1/2006 | Stark |
| 2006/0036580 A1 | 2/2006 | Stata et al. |
| 2006/0036945 A1 | 2/2006 | Radtke et al. |
| 2006/0036965 A1 | 2/2006 | Harris et al. |
| 2006/0041545 A1 | 2/2006 | Heidloff et al. |
| 2006/0047644 A1 | 3/2006 | Bocking et al. |
| 2006/0053383 A1 | 3/2006 | Gauthier et al. |
| 2006/0059035 A1 | 3/2006 | Kraft |
| 2006/0069684 A1 | 3/2006 | Vadlamani et al. |
| 2006/0080303 A1 | 4/2006 | Sargent et al. |
| 2006/0080363 A1 | 4/2006 | Vadlamani et al. |
| 2006/0080468 A1 | 4/2006 | Vadlamani et al. |
| 2006/0095865 A1 | 5/2006 | Rostom |
| 2006/0101051 A1 | 5/2006 | Carr et al. |
| 2006/0101350 A1 | 5/2006 | Scott |
| 2006/0111931 A1 | 5/2006 | Johnson et al. |
| 2006/0117249 A1 | 6/2006 | Hu et al. |
| 2006/0129937 A1 | 6/2006 | Shafron |
| 2006/0165105 A1 | 7/2006 | Shenfield et al. |
| 2006/0173824 A1 | 8/2006 | Bensky |
| 2006/0200432 A1 | 9/2006 | Flinn et al. |
| 2006/0218500 A1 | 9/2006 | Sauve et al. |
| 2006/0224946 A1 | 10/2006 | Barrett |
| 2006/0242557 A1 | 10/2006 | Nortis, III |
| 2006/0242575 A1 | 10/2006 | Winser |
| 2006/0242591 A1 | 10/2006 | Van Dok |
| 2006/0253830 A1 | 11/2006 | Rajanala et al. |
| 2006/0294452 A1 | 12/2006 | Matsumoto |
| 2007/0006075 A1 | 1/2007 | Lection et al. |
| 2007/0006206 A1 | 1/2007 | Dhanjal et al. |
| 2007/0006327 A1 | 1/2007 | Lal et al. |
| 2007/0016857 A1 | 1/2007 | Polleck et al. |
| 2007/0050401 A1 | 3/2007 | Young et al. |
| 2007/0055936 A1 | 3/2007 | Dhanjal |
| 2007/0055943 A1 | 3/2007 | McCormack |
| 2007/0061306 A1 | 3/2007 | Pell et al. |
| 2007/0061307 A1 | 3/2007 | Hartwell et al. |
| 2007/0061308 A1 | 3/2007 | Hartwell et al. |
| 2007/0061705 A1 | 3/2007 | Ammerlaan |
| 2007/0083813 A1 * | 4/2007 | Lui et al. .................... 715/709 |
| 2007/0094597 A1 | 4/2007 | Rostom |
| 2007/0094608 A1 | 4/2007 | Getsch |

(56) References Cited

U.S. PATENT DOCUMENTS

| | | | |
|---|---|---|---|
| 2007/0106951 A1 | 5/2007 | McCormack et al. |
| 2007/0143671 A1 | 6/2007 | Paterson et al. |
| 2007/0156519 A1 | 7/2007 | Agassi et al. |
| 2007/0179841 A1 | 8/2007 | Agassi et al. |
| 2007/0185826 A1 | 8/2007 | Brice et al. |
| 2007/0234290 A1 | 10/2007 | Ronen et al. |
| 2007/0240057 A1 | 10/2007 | Satterfield et al. |
| 2007/0260996 A1 | 11/2007 | Jakobson |
| 2007/0279417 A1 | 12/2007 | Garg et al. |
| 2007/0283287 A1 | 12/2007 | Taylor et al. |
| 2007/0300168 A1 | 12/2007 | Bosma et al. |
| 2008/0034304 A1 | 2/2008 | Feuerbacher et al. |
| 2008/0040682 A1 | 2/2008 | Sorenson et al. |
| 2008/0077571 A1 | 3/2008 | Harris et al. |
| 2008/0141156 A1 | 6/2008 | Reik |
| 2008/0178110 A1 | 7/2008 | Hill et al. |
| 2008/0209316 A1 | 8/2008 | Zandstra |
| 2008/0263462 A1 | 10/2008 | Mayer-Ullmann |
| 2009/0007003 A1 | 1/2009 | Dukhon et al. |
| 2009/0031295 A1 | 1/2009 | Zhao |
| 2009/0034618 A1 | 2/2009 | Fu et al. |
| 2009/0064090 A1 | 3/2009 | Anonson |
| 2009/0083656 A1 | 3/2009 | Dukhon et al. |
| 2009/0100009 A1 | 4/2009 | Karp |
| 2009/0163183 A1 | 6/2009 | O'Donoghue et al. |
| 2009/0205013 A1 | 8/2009 | Lowes |
| 2009/0217192 A1 | 8/2009 | Dean et al. |
| 2009/0217263 A1 | 8/2009 | Gebhart et al. |
| 2009/0222763 A1 | 9/2009 | Dukhon et al. |
| 2009/0249339 A1 | 10/2009 | Larsson et al. |
| 2009/0259950 A1 | 10/2009 | Sullivan et al. |
| 2010/0146478 A1 | 6/2010 | Head et al. |
| 2010/0199261 A1 | 8/2010 | Shenfield et al. |
| 2011/0296322 A1 | 12/2011 | Dhanjal et al. |
| 2011/0307798 A1 | 12/2011 | Lezama Guadarrama et al. |

FOREIGN PATENT DOCUMENTS

| | | | |
|---|---|---|---|
| EP | 1077405 A2 | 2/2001 |
| EP | 1 462 999 A2 | 9/2004 |
| EP | 1 542 133 A2 | 6/2005 |
| JP | 2004-512578 | 4/2004 |
| KR | 10-2002-0004723 A | 1/2002 |
| KR | 10-2003-0070685 | 9/2003 |
| KR | 10-2005-0023805 A | 3/2005 |
| KR | 10-2005-0036702 A | 4/2005 |
| KR | 10-2008-0021262 A | 3/2008 |
| MY | 149803 | 10/2013 |
| WO | WO 03/003240 A2 | 1/2003 |
| WO | WO 2005/103900 A1 | 11/2005 |
| WO | WO 2007/027737 A1 | 3/2007 |
| WO | 2009123801 | 10/2009 |

OTHER PUBLICATIONS

U.S. Official Action dated Mar. 30, 2010 in U.S. Appl. No. 11/217,071.
U.S. Non-Final Office Action dated Sep. 21, 2010 in U.S. Appl. No. 11/217,071.
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
G. Kurtenbach et al., "The Hotbox: Efficient Access to a Large Number of Menu-items," CHI 99 15-20, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.
"Primary Windows," http://www-03.ibm.com/servers/eserver/iseries/navigator/guidelines/primary.html, 23 pgs.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999, 5 pp.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version Mar. 25, 2002, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, Que Corporation, pp. 412, 869.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.

(56) References Cited

OTHER PUBLICATIONS

Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken, Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.
Microsoft Office Word 2003, Part of Microsoft Office Professional Edition 2003, 1983-2003 Microsoft Corporation, 5 pp.
Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A3D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
"TeeChart for .NET Charting Control," TeeChart for NET Steema Software. http://Iwww.teechart.net.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
"Convert to Word 2007," http://www.regencytraining.com/word-2007-conversion.html, Regency Training and Consulting, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," Natural Language Engineering, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," Herschel CSDT Meeeting, pp. 1-21 (Sep. 2007).
Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer). aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Perronne et al. "Building Java Enterprise Systems with J2EE", Publisher: Sams, Pub Date: Jun. 7, 2000 (pp. 1-8).
Padwick, Gordon "Using Microsoft Outlook 2000", 1999 Que Publishing, pp. 530-533.
Slovak, Ken, "Absolute Beginner's Guide to Microsoft Office Outlook 2003," 2003 Que Publishing, pp. 237-241.
Microsoft Press, Microsoft Computer Dictionary, Microsoft Press, Fifth Edition, pp. 374, 382.
Riggsby, McCoy, Haberman and Falciani, "Mastering Lotus Notes and Domino 6." 2003, pp. 18, 22, 33-35, 47, 122, 123, 215-241, 378.
Find any file or email on your PC as fast as you can type!, http://www.x1.com, 2003, 1 page.
"About Google Desktop Search", http://www.desktop.google.com/about.html, Oct. 15, 2004, 8 pages.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Parry; "*CREWS: A Component-Driven, Run-Time Extensible Web Service Framework*"; http://eprints.ru.ac.za/74/01/Parry-MSC.pdf; Dec. 2003; 103 Pgs.
Louw, et al.; "Extensible Web Browser Security"; http://www.cs.uic.edu/~venkat/research/papers/extensible-browser-dimva07.pdf; pp. 1-20.
European Office Action mailed Mar. 9, 2009, Application No. 06790087.8.
International Search Report and Written Opinion mailed Jan. 9, 2007, Application No. PCT/US2006/033809.
International Search Report mailed Aug. 7, 2009, Application No. PCT/US2009/034618.
U.S. Official Action dated Nov. 25, 2008 cited in U.S. Appl. No. 11/154,278.
U.S. Official Action dated Jun. 10, 2009 in U.S. Appl. No. 11/154,278.
U.S. Official Action dated Nov. 13, 2009 in U.S. Appl. No. 11/154,278.
"User Interface Architecture," Data Master 2003, 2 pages.

(56) References Cited

OTHER PUBLICATIONS

Kim et al., "Migrating Legacy Software Systems to CORBA based Distributed Environments through an Automatic Wrapper Generation Technique," http://www.cs.colostate.edu/~bieman/Pubs/KimBieman00.pdf, accessed on Jan. 28, 2009, 6 pages.
Selca, Viki "Customizing the Office Fluent User interface in Access 2007," Microsoft Corporation, Dec. 2006, 22 pages.
European Search Report mailed Dec. 2, 2008, having Appln No. EP 06 79 0087, 7 pages.
U.S. Appl. No. 12/814,084, filed Jun. 11, 2010 entitled "Merging Modifications to User Interface Components While Preserving User Customization".
U.S. Appl. No. 12/331,451, filed Dec. 10, 2008 entitled "Multi-Layered Storage and Management of Software Components" (Microsoft case).
Non-Final Office Action mailed Sep. 15, 2009 in U.S. Appl. No. 11/217,071.
U.S. Appl. No. 13/102,633, filed May 6, 2011 entitled "Markup Based Extensibility for User Interfaces".
U.S. Official Action dated Jun. 7, 2011 in U.S. Appl. No. 12/059,644.
Australian Office Action in Application No. 2006284908 dated Oct. 21, 2010, 2 pages.
Chinese Office Action in Application No. 200980112454.5 dated Aug. 26, 2011, 9 pages.
Chinese Second Office Action in Application No. 200680030421.2 dated Oct. 29, 2010, 11 pages.
International Search Report in Application No. PCT/US2011/037458 dated Feb. 9, 2012, 9 pages.
Japanese Notice of Rejection in Application No. 2008-529218, 3 pages.
U.S. Non-Final Office Action in U.S. Appl. No. 11/814,084 dated Jan. 19, 2012, 35 pages.
U.S. Final Office Action in U.S. Appl. No. 12/059,644 dated Jan. 25, 2012, 16 pages.
U.S. Official Action dated Apr. 19, 2012 in U.S. Appl. No. 13/102,633.
Malaysian Examination Report dated Aug. 30, 2012 in Appln No. PI 20080400, 3 pages.
U.S. Official Action dated Aug. 29, 2012 in U.S. Appl. No. 12/059,644, 30 pages.
U.S. Official Action dated Oct. 24, 2012 in U.S. Appl. No. 13/102,633, 41 pages.
Mexican Office Action dated Feb. 25, 2013 in Appln No. MX/a/2008/002889, 11 pgs.
U.S. Official Action dated Jun. 3, 2013 in U.S. Appl. No. 13/102,622, 29 pgs.
Chinese Third Office Action dated Jul. 18, 2013 cited in Appln No. 200980112454.5, 7 pgs.
U.S. Official Action dated Jun. 21, 2013 in U.S. Appl. No. 12/059,644, 31 pages.
Mexican Office Action dated Apr. 24, 2013 cited in MX/a/2010/010506, 8 pages.
Mexican Office Action dated Jul. 9, 2013 in Appln No. MX/a/2008/002889, 13 pages.
Russian Office Action dated Aug. 12, 2013 in Appln No. 2010140069, 5 pages.
Australian Examination Report dated Nov. 22, 2013 in Appln No. 2009232301, 3 pages.
Chinese Fourth Office Action dated Dec. 4, 2013 in Appln No. 200980112454.5, 6 pages.
Korean Notice of Preliminary Rejection dated Feb. 22, 2013 in Appln No. 10-2008-7005078.
U.S. Official Action dated Jan. 16, 2014 in U.S. Appl. No. 13/102,633, 45 pgs.
U.S. Official Action dated Feb. 14, 2014 in U.S. Appl. No. 12/059,644, 20 pgs.

* cited by examiner

SCOPE-BASED EXTENSIBILITY FOR CONTROL SURFACES

BACKGROUND

Traditionally, the Internet has been a platform that enables the retrieval and display of static content. Today, the Internet is becoming a platform that enables users to create and manage rich content. For example, several leading companies provide Internet-based services that enable users to create and manage word-processing documents, spreadsheets, presentations, and other types of rich content.

To create and manage rich content, a web page may include a control surface. The control surface is a set of user-selectable controls. When the user selects a control in the control surface, a functionality associated with the selected control is provided without navigating the user away from the page. For example, the control surface may include a boldface control that, when selected, makes selected text in the web page bold. In another example, the control surface may include a control that, when selected, spell checks a comment and a control that, when selected, adds the comment post to a blog.

SUMMARY

A server computing system stores a base definition file containing a hierarchy of elements defining a default control surface. In addition, the server computing system stores an extension definition file containing one or more elements defining a customized control surface based on the default control surface. The server computing system generates a modified version of the base definition file in which each element in the base definition file having an identifier corresponding to an identifier of an element in the extension definition file is modified in a way indicated by the element in the extension definition file. The server computing system uses the modified version of the base definition file to generate a resource used by a client computing system to present the customized control surface in a user interface.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, this disclosure is directed to techniques for deployment of a customized control surface. This disclosure describes the techniques with reference to the attached figures. The attached figures are examples. It should be understood that the attached figures do not represent a sole way of implementing the techniques of this disclosure.

Figure 1:
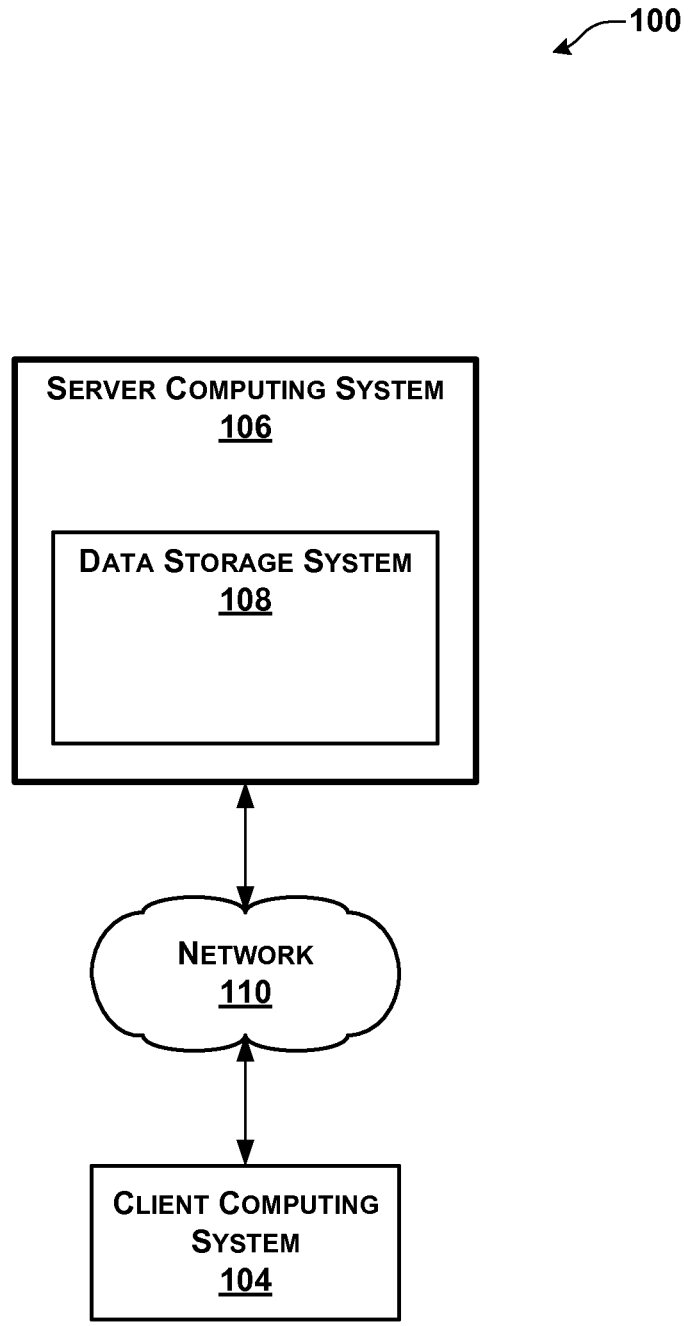
FIG. 1 is a block diagram illustrating an example system.

FIG. 1 is a block diagram illustrating an example system 100. It is to be understood that system 100 is merely one example. The techniques of this disclosure may be implemented in many other ways. For instance, other systems implementing the techniques of this disclosure may include more or fewer components, systems, connections, and so on.

As illustrated in the example of FIG. 1, system 100 includes a client computing system 104. Client computing system 104 is an electronic computing system. As used in this disclosure, an electronic computing system is a set of one or more electronic computing devices. This disclosure describes details of an example electronic computing device with reference to FIG. 8. Client computing system 104 may include a wide variety of different types of electronic computing devices. For example, client computing system 104 may include a personal computer, a mobile telephone, a personal digital assistant (PDA), a digital media player, a television set top box, a television, a home appliance, an industrial appliance, a device integrated into a vehicle, a video game console, an Internet kiosk, a netbook, a laptop computer, a handheld video game device, an intermediate network device, a standalone server device, a server blade device, a network storage device, an Automated Teller Machine, a wearable computing device or another type of electronic computing device.

In addition to client computing system 104, system 100 includes a server computing system 106. Server computing system 106 is an electronic computing system. Like client computing system 104, server computing system 106 may include a wide variety of different types of electronic computing devices. For instance, server computing system 106 may include any of the types of electronic computing devices described above.

In the example of FIG. 1, server computing system 106 includes a data storage system 108. As used in this disclosure, a data storage system is a set of one or more computer-readable data storage media. For example, data storage system 108 may include one or more hard disk drives, optical drives, random-access memory units, registers, flash memory units, tape drives, and/or other types of computer-readable data storage media. Data storage system 108 is capable of storing a wide variety of data. For example, data storage system 108 is capable of storing computer-executable instructions, variables, user data, file systems, databases, and/or other types of data.

System 100 also includes a network 110. Network 110 is an electronic communication network. Network 110 facilitates electronic communication between client computing system 104 and server computing system 106. Network 110 may be implemented in a variety of ways. For example, network 110 may be a wide-area network, such as the Internet. In other examples, network 110 may be a local-area network, a metropolitan-area network, or another type of electronic communication networks. Network 110 may include wired and/or wireless data links. A variety of communications protocols may be used in network 110. Such communications protocols include, but are not limited to, Ethernet, Transmission Control Protocol (TCP), Internet Protocol (IP), Hypertext Transfer Protocol (HTTP), SOAP, remote procedure call (RPC) protocols, user datagram protocol (UDP), IPSec, Resource Reservation Protocol (RSVP), Internet Control Message Protocol (ICMP) and/or other types of communications protocols.

Server computing system 106 hosts a plurality of network-accessible resources. For example, server computing system 106 may host a website containing a plurality of web pages. The network-accessible resources may include a wide variety of resources. For example, the network-accessible resources may include web pages, media streams, digital images, media files, document files, network-accessible application programming interfaces, extensible markup language (XML) files, executable files, and/or other types of resources.

Each network-accessible resource hosted by server computing system 106 is associated with a resource identifier. For example, each network-accessible resource hosted by server computing system 106 may be associated with a uniform resource locator (URL).

To access a resource hosted by server computing system 106, client computing system 104 sends a resource request to server computing system 106 via network 110. The resource request specifies a resource identifier of the resource. Client computing system 104 may use a variety of communications protocols to send the resource request to server computing system 106. In a first example, client computing system 104 may use the SOAP protocol to send the resource request to server computing system 106. In a second example, client computing system 104 may use the HTTP protocol to send the resource request to server computing system. In this second example, the resource request is an HTTP request specifying a resource name of the resource and a host name of server computing system 106.

Upon receiving the resource request, server computing system 106 retrieves from data storage system 108 a source file associated with the requested resource. Server computing system 106 may perform a variety of actions of the source file. For example, if the requested resource is an ASP.NET web page, the source file is an XML document defining the content of the ASP.NET web page. In this example, server computing system 106 processes the source file to generate an HTML file that server computing system 106 sends to client computing system 104. In another example, if the requested resource is a digital image file, the source file may contain the digital image file. In this example, client computing system 104 may simply forward the digital file to client computing system 104.

Server computing system 106 hosts one or more control surface resources. A control surface resource is a file containing information usable by a client computing system to deploy a control surface in a user interface. As used in this disclosure, a control surface is a set of user-selectable controls. In one example, a control surface may be a control ribbon. Upon receiving a resource request for a control surface resource, server computing system 106 automatically retrieves a base definition file from data storage system 108. The base definition file comprises a hierarchy of elements. The hierarchy of elements in the base definition file defines a default control surface. The user interface may be a wide variety of graphical user interfaces. For example, the user interface may be a web page, a user interface of a general purpose client application, a user interface of a special purpose client application, or another type of graphical user interface.

Each element in the base definition file is associated with an identifier. No two elements in the base definition file are associated with the same identifier. The identifiers may be implemented in a variety of ways. For example, the identifiers may be implemented as text strings, alphanumeric strings, integers, floating point numbers, and data of other data types.

The base definition file may be implemented in a variety of ways. For example, the base definition file may be implemented as an XML file. In this example, each element in the hierarchy of elements in the base definition file is an XML element. Furthermore, in this example, each element includes an attribute specifying the identifier of the element.

In addition, server computing system 106 automatically retrieves at least one applicable extension definition file from data storage system 108. An extension definition file comprises a hierarchy of elements defining a customized control surface based on the default control surface. Each element in the extension definition file is associated with an identifier. The extension definition file may be implemented in a variety of ways. For example, the extension definition file may be implemented as an XML file. In this example, each element in the hierarchy of elements in the extension definition file is an XML element. Furthermore, in this example, each element includes an attribute specifying the identifier of the element. Each element in the extension definition file explicitly or implicitly indicates an action.

After retrieving the base definition file and the extension definition file, server computing system 106 automatically generates a modified version of the base definition file. In one example, server computing system 106 generates the modified version of the base definition file by first generating a base parse tree. The base parse tree contains nodes representing each element in the base definition file. In one example implementation, each node is a data structure having members for each attribute of an element. The nodes in the base parse tree have same hierarchical structure as the elements in the base definition file. For example, the base definition file may include a first element and a second element, the first element being a parent of the second element. In this example, the base parse tree includes a first node and a second node. The first node represents the first element and the second node represents the second element. In this example, the first node is a parent of the second node. Server computing system 106 also automatically generates an extension parse tree. The extension parse tree contains nodes representing each element in the extension definition file.

As described in detail below with regard to FIG. 4, after generating the base parse tree, server computing system 106 automatically examines each node in the parse tree. For each node in the base parse tree having an identifier corresponding to an identifier of a node in the extension parse tree, server computing system 106 automatically modifies the element in the base parse tree by performing the action indicated by the node in the extension parse tree. For example, a first node in the base parse tree has the identifier "1234" and a second node in the extension parse tree has the identifier "1234" and specifies a "replace subtree" action. In this example, server computing system 106 automatically removes the first node and each descendant node of the first node from the base parse tree. Further, in this example, server computing system 106 automatically adds the second node and each descendant node of the second node to the base parse tree in place of the first node and the first node's descendant nodes. In this example, the modified parse tree is the modified version of the base definition file.

After generating the modified version of the base definition file, server computing system 106 automatically uses the modified version of the base definition file to generate the requested control surface resource. Server computing system 106 then sends the requested control surface resource to client computing system 104. As described below with reference to FIG. 5, client computing system 104 is configured to use the control surface resource to deploy a control surface in a user interface. A user of client computing system 104 is then able to use the control surface to invoke functionalities associated with the controls in the control surface.

An administrator is able to define extension definition files. By defining appropriate extension definition files the administrator is able to effectively change the default control surface defined by the base definition file into a customized control surface suitable for a particular native application, web application, web site, web page, or web part. For instance, the administrator is able to define extension definition files that remove tabs, controls, groups of controls, menus, and so on from the default control surface. Further, the administrator is able to define extension definition files that add tabs, controls, groups of controls, menus, buttons, and so on to the default control surface.

In this way, the extension definition file acts to replace a default control surface with a customized control surface. The customized control surface may include more or fewer controls than the default control surface.

Figure 2:
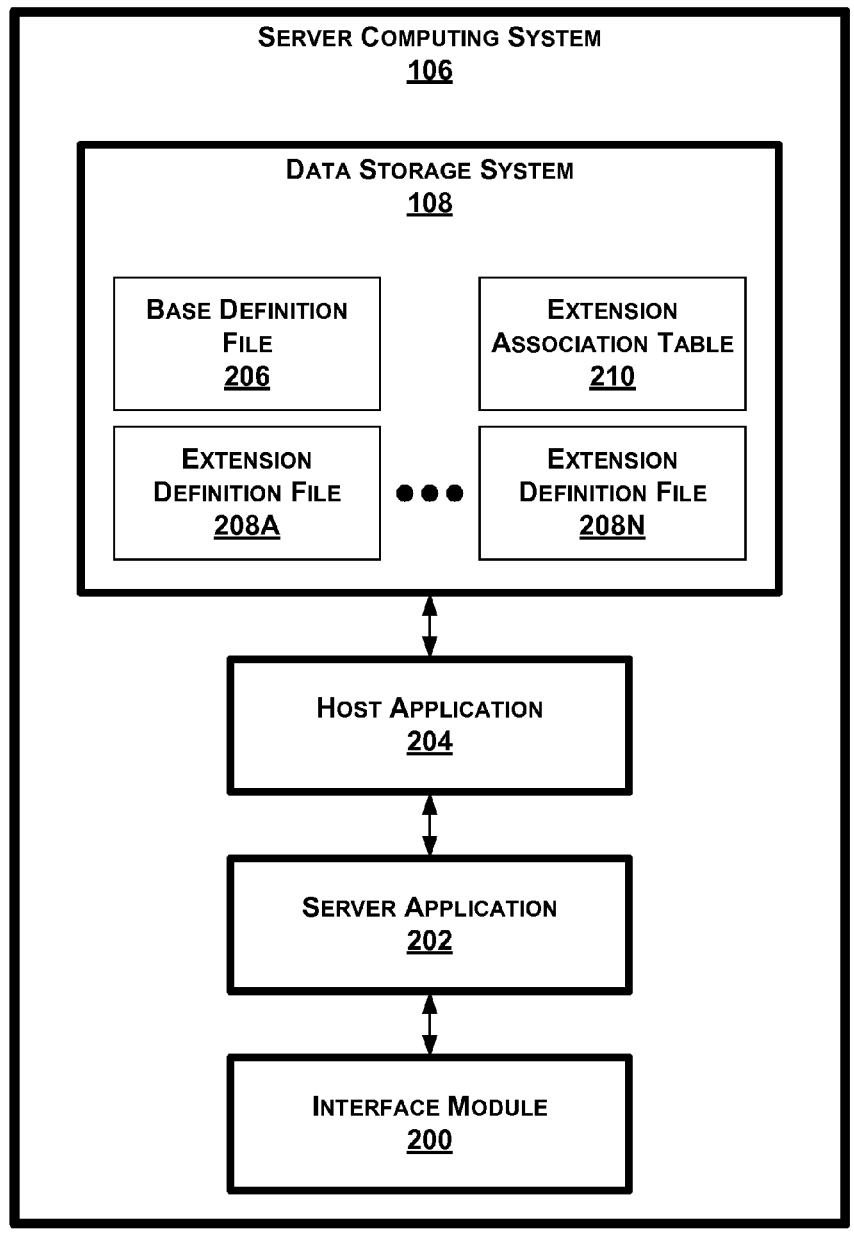
FIG. 2 is a block diagram illustrating example logical components of a server computing system.

FIG. 2 is a block diagram illustrating example logical components of server computing system 106. It should be appreciated that logical components in FIG. 2 are provided by explanatory purposes only and not intended to represent a sole way of logically organizing server computing system 106. Rather, many other logical organizations of server computing system 106 are possible.

As illustrated in the example of FIG. 2, server computing system 106 comprises an interface module 200, a server application 202, and a host application 204. In addition, server computing system 106 comprises data storage system 108. Data storage system 108 comprises a base definition file 206, a set of extension definition files 208A-208N (collectively, "extension definition files 208"), and an extension association table 210.

Interface module 200 enables server computing system 106 to send and receive information on network 110. When interface module 200 receives a resource request, interface module 200 provides the resource request to server application 202. As described below with reference to FIG. 4, when server application 202 receives a resource request requesting a control surface resource, server application 202 identifies host application 204 as an application to process the resource request. When host application 204 receives the resource request, host application 204 uses base definition file 206 and one or more of extension definition files 208 to generate the requested control surface resource. Server application 202 then uses interface module 200 to send the requested control surface resource to client computing system 104.

As briefly described above, base definition file 206 comprises a hierarchy of elements defining a default control surface. In one example implementation, base definition file 206 defines the default control surface such that the default control surface includes one or more tabs. Each tab comprises a tab title and a control area. The tab title of a tab includes the name of the tab. The control area of a tab is an area capable of containing one or more controls. The tab titles of each tab in the control surface are presented along the top of the control surface. As described below, clicking on a tab title of a tab causes the command area of the tab to be displayed. For example, base definition file 206 may include a set of tabs that facilitate the management of a blog. In this example, base definition file 206 may include a "Posts" tab and a "Comments" tab. The "Posts" tab includes controls enabling the user to manage blog posts and the "Comments" tab includes controls enabling the user to manage comments.

Controls in a control area of a tab may be divided into one or more control groups. A control group is a visual grouping of logically associated controls. Each control group has a title and a control area. Continuing the previous example, the posts tab may include a control group with the title "New" and a control group with the title "Posts." Controls in the "New" control group enable a user to create a new blog post. Controls in the "Posts" group enable a user to manage existing blog posts.

A control group may include a variety of different types of controls. For instance, a control group may include button controls, drop-down box controls, check box controls, menu controls, and so on. Continuing the above example, the "New" control group may contain a single button labeled "New Post" and the "Posts" group may contain buttons labeled "Edit Post," "View Post," "Manage Permissions," "Delete Post," and so on. In this example, base definition file 206 may appear as follows:

```
<Surface Id="Surface" ... >
    <Tabs Id="Surface.tabs">
        <Tab Id="Surface.Blog.Posts" ... Title="Posts">
            <Groups Id="Surface.Blog.Posts.Groups">
                <Group Id="Surface.Blog.Posts.New" title="New">
                    <Controls Id="Surface.Blog.Posts.New.Controls">
                        <Button
                            Id="Ribbon.Blog.Posts.New.NewPost"
                            Sequence="3"
                            Command="NewListItem"
                            LabelText="New Post"
                            Image16by16="/_layouts/images/newitem.gif"
                            Image32by32="/_layouts/images/menunewitem.gif"
                            Alt="New Post"
                        />
                    </Controls>
                </Group>
                <Group Id="Surface.Blog.Posts.Posts">
                    ...
        <Tab Id="Surface.Blog.Comments" ... Title="Comments">
            ...
    </Tabs>
</Surface>
```

In this above example, elements defining controls for the "Posts" group and some attributes of the elements have been omitted for sake of brevity. Note in the above example, that each element includes a unique identifier.

In this disclosure, interface module 200, server application 202 and host application 204 are referred to as functional modules of server computing system 106. The functional modules of server computing system 106 may be implemented in a wide variety of ways. In a first example, one or more of the functional modules of server computing system 106 may be implemented as sets of instructions stored at a data storage system. In this first example, a processing unit within server computing system 106 may execute the sets of instructions, thereby causing server computing system 106 to perform the behaviors associated with one or more of the functional modules of server computing system 106. As used in this disclosure, a processing unit is a set of one or more physical electronic integrated circuits that are capable of executing instructions. In a second example, one or more of the functional modules of server computing system 106 are implemented as one or more application-specific integrated circuits (ASICs). The ASICs cause server computing system 106 to perform the behaviors associated with one or more of the functional modules of server computing system 106. In this second example, the ASICs may be specifically designed to perform the behaviors associated with one or more of the functional modules of server computing system 106.

Figure 3:
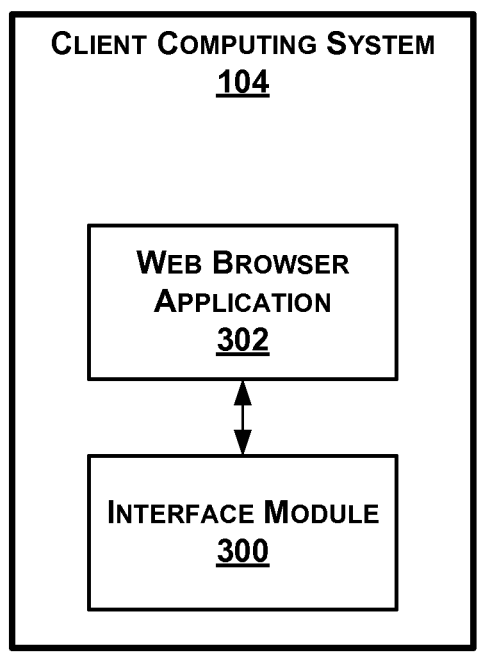
FIG. 3 is a block diagram illustrating example logical components of a client computing system.

FIG. 3 is a block diagram illustrating example logical components of client computing system 104. It should be appreciated that logical components in FIG. 3 are provided for explanatory purposes only and not intended to represent a sole way of logically organizing client computing system 104. Rather, many other logical organizations of client computing system 104 are possible.

As illustrated in the example of FIG. 3, client computing system 104 comprises an interface module 300 and a web browser application 302. Interface module 300 enables client computing system 104 to communicate on network 110 (FIG. 1). For example, network interface module 300 enables client computing system 104 to send and receive communication protocol messages on network 110. As described below with reference to FIG. 5, web browser application 302 enables a user to interact with client computing system 104 to cause client computing system 104 to retrieve resources available on network 110 and to display certain types of resources.

In this disclosure, interface module 300 and web browser application 302 are referred to as functional modules of client computing system 104. The functional modules of client computing system 104 may be implemented in a wide variety of ways. In a first example, one or more of the functional modules of client computing system 104 may be implemented as sets of instructions stored at a data storage system. In this first example, a processing unit within client computing system 104 may execute the sets of instructions, thereby causing client computing system 104 to perform the behaviors associated with one or more of the functional modules of client computing system 104. In a second example, one or more of the functional modules of client computing system 104 are implemented as one or more ASICs. The ASICs cause client computing system 104 to perform the behaviors associated with one or more of the functional modules of client computing system 104. In this second example, the ASICs may be specifically designed to perform the behaviors associated with one or more of the functional modules of client computing system 104.

Figure 4:
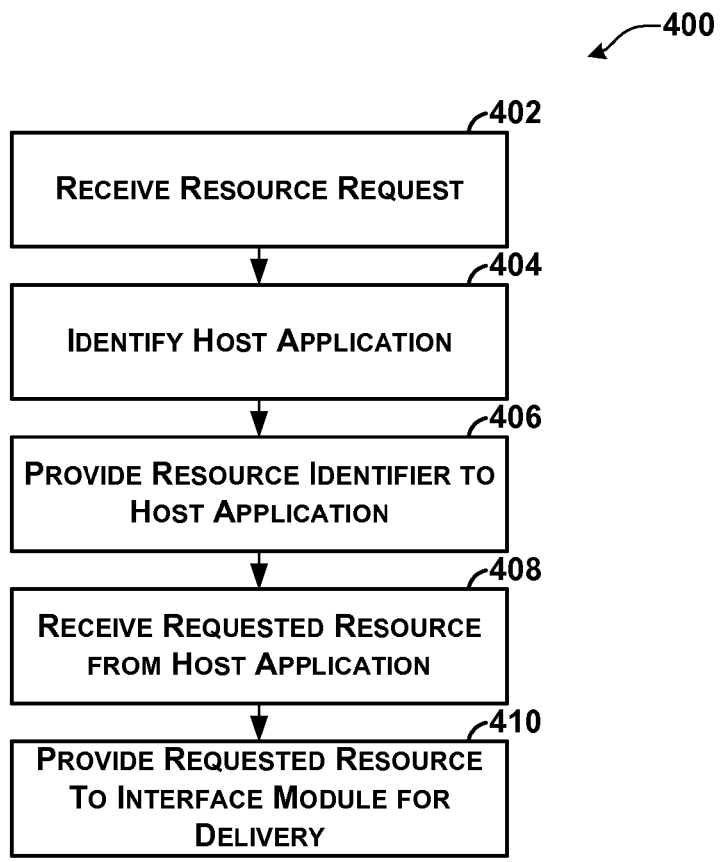
FIG. 4 is a flowchart illustrating an example operation of a server application in the server computing system.

FIG. 4 is a flowchart illustrating an example operation 400 of server computing system 106. It should be appreciated that operation 400 is merely an example operation of server computing system 106. Many other operations of server computing system 106 are possible. For instance, other operations of server computing system 106 may include more or fewer steps. In other instances, operations of server computing system 106 may include the steps of operation 400 in different orders. Furthermore, FIGS. 4-7 explain the techniques of this disclosure with reference to web pages and web services. It should be appreciated that some implementations may employ the techniques of this disclosure with regard to other types of user interfaces and other data processing architectures.

Initially, server application 202 receives a resource request (402). The resource request requests a resource hosted by server computing system 106. The resource request includes a resource identifier that identifies the requested resource.

In response to receiving the resource request, server application 202 identifies a host application associated with the requested resource (404). Server application 202 may identify the host application in a variety of ways. For example, server application 202 may identify the host application based on the data type of the requested resource. In another example, server application 202 may identify the host application based on the website containing in the requested resource. In this disclosure, it is assumed that server application 202 identifies host application 204 as the host application associated with the requested resource.

After server application 202 identifies host application 204 as the host application associated with the requested resource, server application 202 provides the resource identifier of the requested resource to host application 204 (406). Server application 202 may provide the resource identifier of the requested resource to host application 204 in a variety of ways. For example, server application 202 may provide the resource identifier of the requested resource to host application 204 by invoking a method of host application 204 and providing the resource identifier as a parameter of the method.

Subsequently, server application 202 receives the requested resource from host application 204 (408). Server application 202 may receive the requested resource from host application 204 in a variety of ways. For example, server application 202 may receive the requested resource from host application 204 as a return parameter of a method invoked when server application 202 provided the resource identifier to host application 204.

Upon receiving the requested resource, server application 202 provides the requested resource to interface module 200 for delivery to client computing system 104 via network 110 (410).

Figure 5:
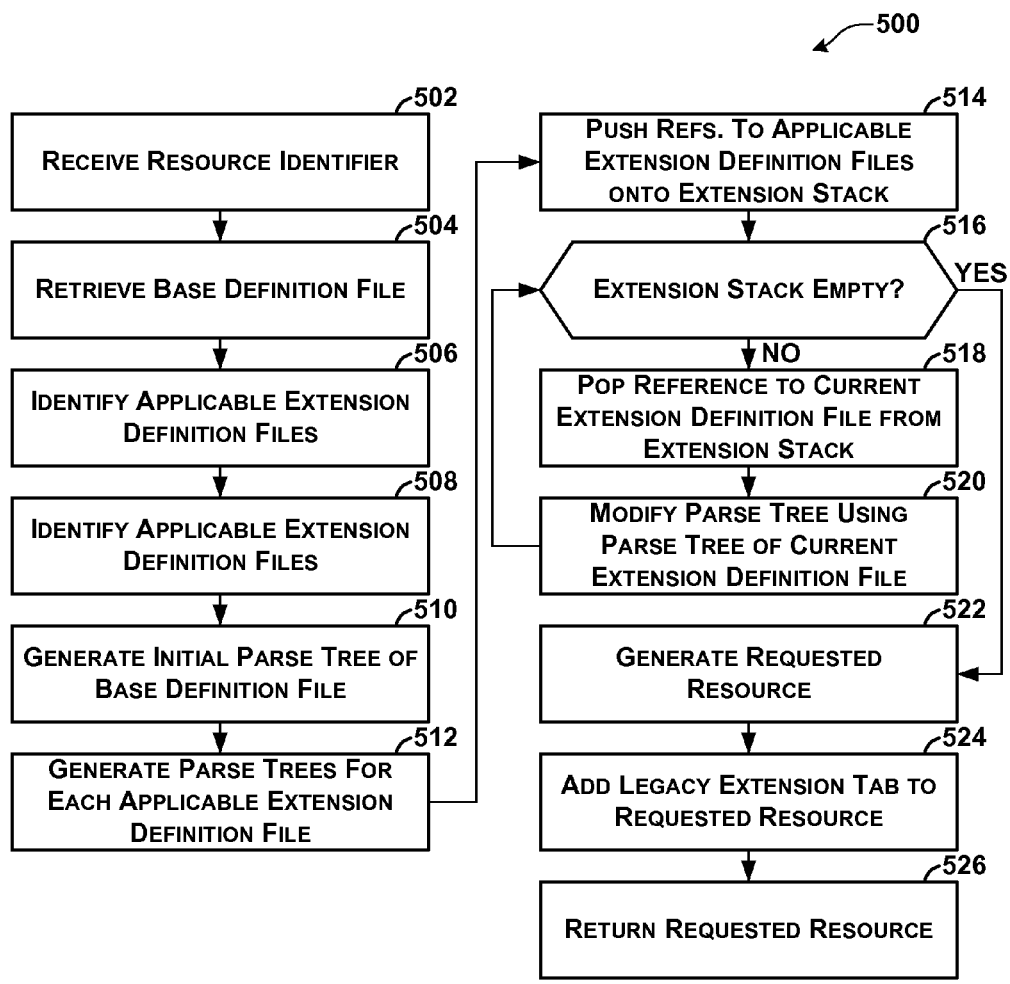
FIG. 5 is a flowchart illustrating an example operation of a host application in the server computing system.

FIG. 5 is a flowchart illustrating an example operation 500 of server computing system 106. It should be appreciated that operation 500 is merely an example operation of server computing system 106. Many other operations of server computing system 106 are possible. For instance, other operations of server computing system 106 may include more or fewer steps. In other instances, operations of server computing system 106 may include the steps of operation 500 in different orders.

Operation 500 starts when host application 204 receives a resource identifier from server application 202 (502). In response to receiving the resource identifier, host application 204 automatically retrieves base definition file 206 from data storage system 108 (504).

Host application 204 then automatically identifies one or more of extension definition files 208 as applicable to the requested resource (506). Host application 204 may identify one or more of extension definition files 208 as applicable to the requested resource in a variety of ways. For example, host application 204 may determine that extension definition file 208A is applicable to the requested resource when the requested resource is associated with a particular web application associated with extension definition file 208A. Furthermore, in this example, host application 204 may determine that extension definition file 208B is applicable to the requested resource when the requested resource is in a particular website associated with extension association file 208B. Furthermore, in this example, host application 204 may determine that extension definition file 208C is applicable to the requested resource when the requested resource is in a particular webpage associated with extension definition file 208C. Extension association table 210 in data storage system 108 may store data associating extension definition files 208 with individual resources or groups of resources hosted by server computing system 106. After identifying the applicable extension definition files, host application 204 retrieves the applicable extension definition files from data storage system 108 (508).

After host application 204 retrieves the applicable extension definition files, host application 204 automatically generates an initial parse tree of base definition file 206 (510). As described briefly above, the parse tree is a data structure comprising a set of nodes. Each node in the parse tree represents an element in base definition file 206. The nodes are linked together to represent the parent-child relationships among the elements in base definition file 206.

Each node is a data structure comprising one or more properties. The properties of a node include an identifier property. The identifier property of a node stores the identifier of the node. For example, the identifier property of a node representing a "<tab Id="surface.tab.blog"> . . . </tab>" in base definition file 206 may have the value "surface.tab.blog." Further, the properties of a node include a type property. The type property of a node stores a value indicating an element type. For example, the type property of a node representing a "<tab . . . > . . . </tab>" element in base definition file 206 may have the value "tab." In one example implementation, a node representing an element in base definition file 206 has a property for each attribute of the element.

Host application 204 may generate a parse tree for all or part of the base definition file. In one example implementation, a first resource identifier identifies a control surface resource based on only those elements of base definition file 206 that are tab elements or ancestors of tab elements. In this example implementation, when host application 204 receives this resource identifier, host application 204 does not include in the parse tree any nodes representing child nodes of tab elements. Furthermore, in this example implementation, additional resource identifiers identify control surface resources based on only those elements of base definition file 206 that are tab elements or descendants of tab elements. In this example implementation, when host application 204 receives one of these resource identifiers, host application 204 only includes in the parse tree nodes representing a tab node and descendant nodes of the tab node. As described below with reference to FIG. 7, this example implementation may be more efficient than generating a parse tree of all of base definition file 206.

After generating the parse tree, host application 204 automatically generates parse trees for each applicable extension definition file (512). The parse trees for the applicable extension definition files are data structures comprising sets of nodes. Each node in a parse tree for an extension definition file represents an element in the extension definition file. The nodes in the parse tree for the extension definition file are linked together to represent the parent-child relationships among the elements in the extension definition file. Furthermore, each node in the parse tree for the extension definition file includes properties storing attributes of represented elements of the extension definition file.

Next, host application 204 automatically pushes references to each of the applicable extension definition files onto an extension stack (514). The extension stack is a stack data structure capable of storing references to applicable extension definition files. As mentioned briefly above, extension definition files are associated with differing scopes of applicability. For instance, a first extension definition file may be applicable to an entire web application, a second extension definition file may be applicable to a site collection within the application, a third extension definition file may be applicable to a site within the site collection, and so on. Associating extension definition files with differing scopes enables an administrator to customize control surfaces for various purposes. Host application 204 pushes the references to the applicable extension definition files onto the extension stack starting with a most-specific one of the applicable extension definition files and progressing to the least-specific one of the applicable extension definition files. For example, if the applicable extension definition files include a first extension definition file associated with a site collection and a second extension definition file associated with a site within the site collection, host application 204 first pushes a reference to the second extension definition file onto the extension stack and then pushes a reference to the first extension definition file onto the extension stack.

After pushing the references to each of the applicable extension definition files on the extension stack, host application 204 automatically determines whether the extension stack is empty (516). In other words, host application 204 automatically determines whether the extension stack includes any references to applicable extension definition files.

In response to determining that the extension stack is not empty ("NO" of 516), host application 204 automatically pops a reference to a current extension definition file from the extension stack (518). Popping a reference to a current extension definition file from the extension stack removes the reference to the most-general remaining applicable extension definition file from the extension stack.

Next, host application 204 modifies the parse tree of base definition file 206 using the parse tree of the current extension definition file (520). An example operation of host application 204 to modify the parse tree of base definition file 206 using the parse tree of the current extension definition file is explained below with reference to FIG. 6. After modifying the parse tree of base definition file 206 using the parse tree of the current extension definition file, host application 204 loops back and again determines whether the extension stack is empty (516).

In response to determining that the extension stack is empty ("YES" of 516), host application 204 automatically uses the modified parse tree of base definition file 206 to generate the requested control surface resource (522). In the example of FIG. 5, the requested control surface resource is the resource identified by the resource identifier provided to host application 204 at step 502. Host application 204 may use the modified parse tree of base definition file 206 to generate the requested control surface resource in a variety of ways. For example, host application 204 may perform a post-order traversal of the modified parse tree. In this example, as host application 204 traverses each node in the modified parse tree, host application 204 invokes a function associated with the type of the node. The function associated with the type of the node generates output be included in the requested control surface resource. The requested control surface resource may be formatted in a variety of ways. For example, the requested control surface resource may be formatted as an XML file containing XML elements. In another example, the requested control surface resource may be formatted as a JavaScript Object Notation (JSON) file.

After generating the requested control surface resource, host application 204 automatically adds a legacy extension tab to the requested control surface resource (524). The legacy extension tab is a tab within the control surface. The legacy extension tab includes user-selectable controls added using other control surface editing systems. For example, a previous version of host application 204 may have included a control surface customization extension point. In this example, a programmer may register a block of code to the control surface customization extension point. In this example, when the previous version of host application 204 receives a request for a control surface, the previous version of host application 204 executes all blocks of code registered to the control surface customization extension point. In this example, the block of code registered to the control surface customization extension point may add custom controls to the requested control surface. Because an enterprise may have invested considerable resources in developing the block of code, the enterprise may not want to do away with the block of code in favor of the customization technique described above. In this example, host application 204 uses the block of code to generate user-selectable controls in a separate legacy controls tab. In this way, the custom controls of the block of code are still available.

After using the modified parse tree of base definition file 206 to generate the requested control surface resource, host application 204 automatically returns the requested control surface resource to server application 202 (526). Host application 204 may return the requested control surface resource to server application 202 in a variety of ways. For example, host application 204 may return the requested control surface resource to server application 202 as a return object of a method of host application 204 invoked by server application 202. As explained above with reference to FIG. 4, server application 202 may use interface module 200 to send the requested control surface resource to client computing system 104.

Figure 6:
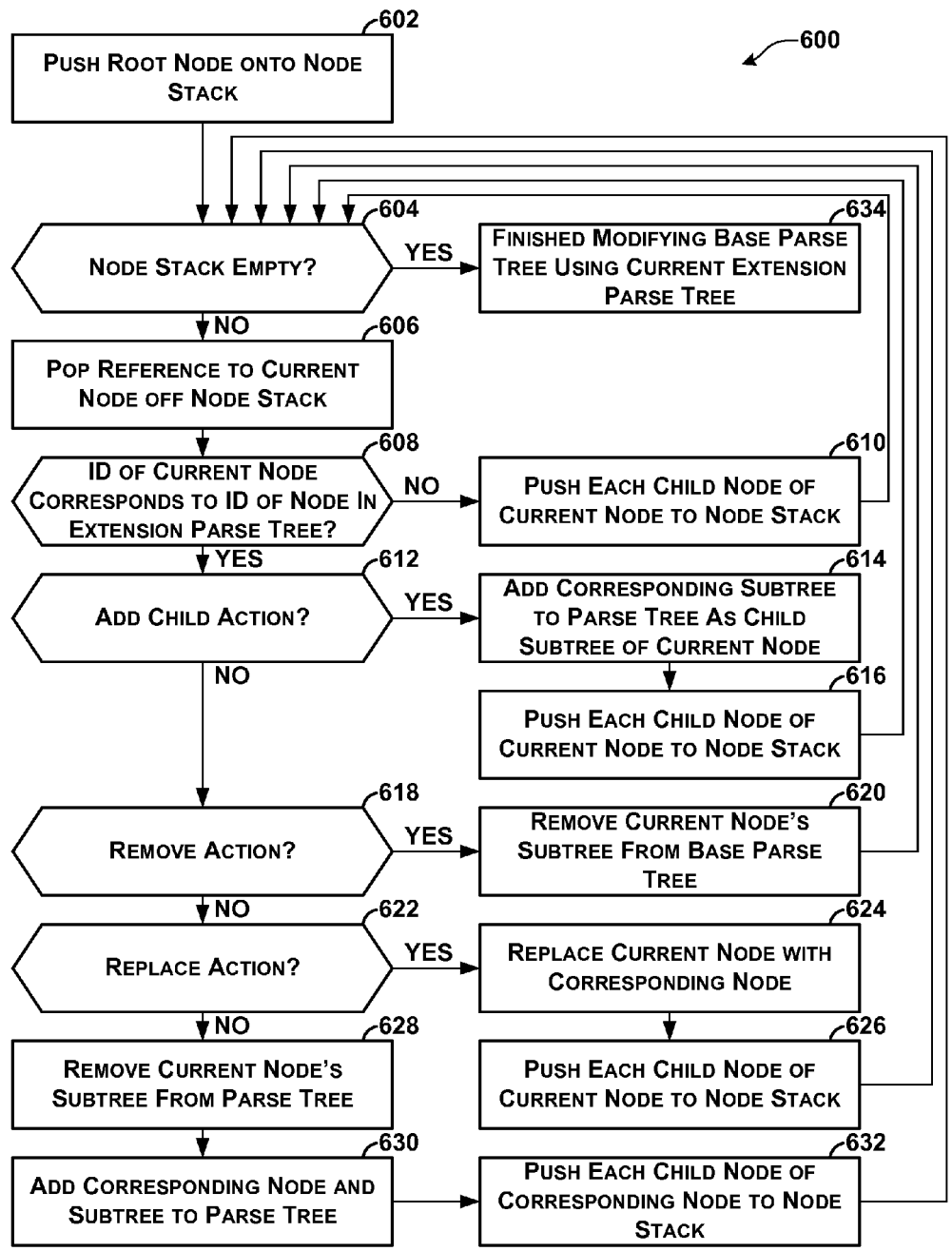
FIG. 6 is a flowchart illustrating an example operation of the host application to modify a parse tree.

FIG. 6 is a flowchart illustrating an example operation 600 of host application 204 to modify a parse tree of base definition file 206. It should be appreciated that operation 600 is merely an example operation of host application 204. Many other operations of host application 204 are possible. For instance, other operations of host application 204 may include more or fewer steps. In other instances, operations of host application 204 may include the steps of operation 600 in different orders. In the example of FIG. 6, the parse tree of base definition file 206 is referred to as the base parse tree and the parse tree of the current extension definition file is referred to as the current extension parse tree.

Operation 600 begins when host application 204 pushes a root node of the base parse tree onto a node stack (602). The node stack is a stack data structure capable of storing references to nodes. Next, host application 204 automatically determines whether the node stack is empty (604). In other words, host application 204 automatically determines whether the node stack includes any references to any nodes.

In response to determining that the node stack is not empty ("NO" of 604), host application 204 automatically pops a reference to a current node off the node stack (606). Popping the reference to the current node off the node stack removes the reference to the current node from the node stack.

Next, host application 204 determines whether the identifier of the current node corresponds to an identifier of a node in the current extension parse tree (608). For example, the identifier property of current node may have a value of "surface.tabs.blog." In this example, host application 204 determines whether any node in the current extension parse tree has an identifier property having the value "surface.tabs.blog." In the example of FIG. 6, a node in the current extension parse tree having an identifier corresponding to the identifier of the current node is referred to as the "corresponding node." In addition, the corresponding node may have one or more descendant nodes. In the example of FIG. 6, the corresponding nodes and its descendant nodes are referred to as the "corresponding subtree."

In response to determining that the identifier of the current node does not correspond to an identifier of any node in the current extension parse tree ("NO" of 608), host application 204 automatically pushes onto the node stack references to each child node of the current node (610). For example, if the current node has two child nodes, host application 204 automatically pushes references to each of these child nodes onto the node stack. In another example, if the current node does not have any child nodes, host application 204 does not push any reference to any node onto the node stack. After pushing onto the node stack references to each child node of the current node, host application 204 loops back and again determines whether the node stack is empty (604).

On the other hand, in response to determining that the identifier of the current node corresponds to an identifier of a node in the current extension parse tree ("YES" of 608), host application 204 automatically determines whether the action indicated by the corresponding node is an add child action (612). In one example implementation, host application 204 determines whether the action indicated by the corresponding node is an add child action by determining whether an action property of the corresponding node specifies the add child action.

In response to determining that the action indicated by the corresponding node is an add child action ("YES" of 612), host application 204 automatically adds the corresponding subtree to the base parse tree as a child subtree of the current node (614). Thus, if the current node had two child subtrees, host application 204 would add the corresponding subtree as a third subtree of the current node. A child subtree of a node is a child node of the node and each descendant node of the child node.

After adding the corresponding subtree to the base parse tree as a child subtree of the current node, host application 204 pushes onto the node stack references to each child node of the current node (616). Because host application 204 has already added the corresponding subtree to the parse tree, the references pushed onto the node stack include a reference to the corresponding node. After pushing onto the node stack references to each child node of the current node, host application 204 automatically loops back and again determines whether the node stack is empty (604).

In response to determining that the action indicated by the corresponding node is not an add child action ("NO" of 612), host application 204 automatically determines whether the action indicated by the corresponding node is a remove action (618). In response to determining that the action indicated by the corresponding node is a remove action ("YES" of 618), host application 204 automatically removes the current node's subtree from the base parse tree (620). The current node's subtree comprises the current node and all descendant nodes of the current node. In this way, the current extension definition file may act to remove controls from the control surface. For example, the current node may represent a tab element defining a tab in the control surface. In this example, the remove action of the corresponding node effectively removes the tab from the control surface. After removing the current node's subtree from the base parse tree, host application 204 automatically loops back and again determines whether the node stack is empty (604).

In response to determining that the action indicated by the corresponding node is not the remove action ("NO" of 618), host application 204 automatically determines whether the action indicated by the corresponding node is a replace action (622). If host application 204 determines that the action indicated by the corresponding node is a replace action ("YES" of 622), host application 204 replaces the current node with the corresponding node (624). For example, assume that the current node represents the following element in base definition file 206: "<group Id="surface.blog.posts.posts" title="Posts">. . . </group>" and assume that the corresponding node represents the following element in the current extension definition file: "<group Id="surface.blog.posts.posts" title="My Posts">. . . </group>." In this example, the replace action effectively replaces the title attribute "Posts" with the title attribute "My Posts." Replacing the current node with the corresponding node does not replace the current node's descendant nodes with the corresponding node's descendant nodes or otherwise change the current node's descendant nodes.

After replacing the current node with the corresponding node, host application 204 automatically pushes onto the node stack references to each child node of the current node (626). Host application 204 then automatically loops back and again determines whether the node stack is empty (604).

In response to determining that the action indicated by the corresponding node is not the replace action ("NO" of 622), host application 204 automatically removes the current node's subtree from the base parse tree (628). Next, host application 204 automatically adds the corresponding subtree to the base parse tree in place of the current node's subtree (630). In this way, host application 204 effectively replaces the current node and the current node's descendant nodes with the corresponding node and the corresponding node's descendant nodes. For example, an administrator may consider the first group of controls unnecessary in a given scope but considers the second group of controls to be necessary in the given scope. Accordingly, in this example, the administrator designs the extension definition file such that the extension definition file includes an element defining the second group of controls, the element specifying the identifier of an element in the base definition file defining the first group of controls. In this example, if the current node represents the element defining the first group of controls, the corresponding node represents the element defining the second group of controls. In this way, the second group of controls replaces the first group of controls.

After adding the corresponding node's subtree to the base parse tree, host application 204 automatically pushes onto the node stack references to each child node of the corresponding node (632). Host application 204 then automatically loops back and again determines whether the node stack is empty (604).

In response to determining that the node stack is empty ("YES" of 604), host application 204 has finished modifying the base parse tree using the current extension parse tree (634).

Figure 7:
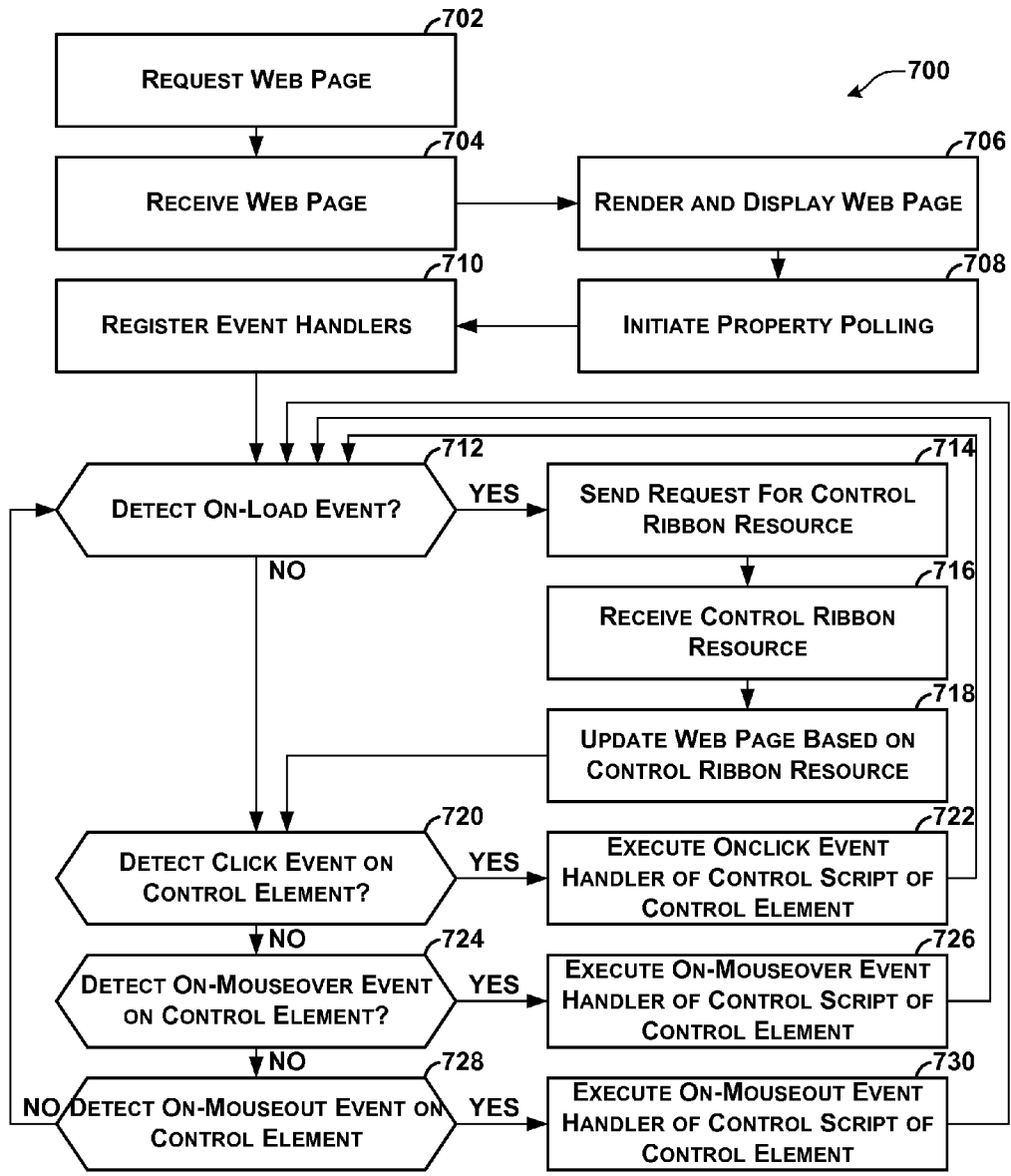
FIG. 7 is a flowchart illustrating an example operation of the client computing system.

FIG. 7 is a block diagram illustrating an example operation 700 of client computing system 104. It should be appreciated that operation 700 is merely an example operation of client computing system 104. Many other operations of client computing system 104 are possible. For instance, other operations of client computing system 104 may include more or fewer steps. In other instances, operations of client computing system 104 may include the steps of operation 700 in different orders.

In the example of FIG. 7, operation 700 begins when web browser application 302 sends a web page request to server computing system 106 via network 110 (702). The web page request requests a web page hosted by server computing system 106. The web page request includes a resource identifier identifying the web page. Web browser application 302 may send the web page request in response to a variety of events. For example, web browser application 302 may send the web page request in response to receiving a URL associated with the web page from a user of client computing system 104.

Subsequently, web browser application 302 receives the web page from server computing system 106 via network 110 (704). The web page includes one or more scripts that operate to deploy a control surface within the web page. The scripts may be formatted in a variety of ways. For example, the scripts may be formatted as JavaScript scripts, VBScript scripts, or may be formatted in another scripting language. The scripts include a control surface request script. In one example implementation, the web page includes one or more control surface resource URLs. The control surface resource URLs identify control surface resources. As described below, web browser application 302 may use the control surface resource URLs to request the control surface resources from server computing system 106. To facilitate caching at web browser application 302, server computing system 106 may, in one example implementation, generate the control surface resource URLs such that the control surface resource URLs include a hash parameter representative of the extension definition files currently installed at server computing system 106. For instance, in this example implementation, the hash parameter may be a hash value calculated over each of extension definition files 208.

After receiving the web page, web browser application 302 renders and displays the web page (706). Rendering the web page entails processing the received web page to generate a property-formatted viewable document. Web browser application 302 displays this document. As described below, the event handlers listen for events occurring in the web page. In addition, web browser application 302 begins execution of any of the scripts that are meant to be executed when the web page is received.

In the example of FIG. 7, web browser application 302 initiates execution of a property polling script in the web page (708). The property polling script polls the properties of objects in the web page and builds a properties bag that specifies the current properties of the objects. In one example implementation, the property polling script polls the properties of objects in the web page on a periodic basis. Furthermore, in some example implementations, the property polling script polls the properties of objects in the web page in response to a direct request by another script module in the web page. As described below, scripts use the properties bag to determine whether to enable or disable controls in the control surface. For example, the web page may include a text entry area and the control surface may include a copy button. Furthermore, in this example, the text entry area has a property indicating whether text in the text entry area is selected. The property polling script polls the text entry area and adds a property to the property bag indicating whether text is selected. If text is selected, a script associated with the copy control may disable the copy control when no text is selected and enable the copy control when text is enabled.

After initiating property polling, web browser application 302 registers event handlers specified by the scripts in the web page (710). Event handlers are portions of the scripts executed when particular events occur. In one example implementation, the control surface request script includes an on-load event handler. After web browser application 302 registers the event handlers, web browser application 302 initiates an event detection loop.

During the event detection loop, web browser application 302 first detects whether an on-load event has occurred (712). In response to detecting an on-load event, web browser application 302 sends a request for a control surface resource to server computing system 106 (714). Web browser application 302 requests the control surface resource because the control surface request script in the web page includes an event listener that listens for the on-load event. To request the control surface resource, web browser application 302 sends a control surface request to server computing system 106. The control surface request includes the URL identifying the control surface resource.

After sending the request for the control surface resource, web browser application 302 receives the control surface resource from server computing system 106 (716). In one example implementation, when web browser application 302 receives the control surface resource, web browser application 302 caches the control surface resource. In this example implementation, whenever web browser application 302 is instructed to receive a resource identified by a given URL, web browser application 302 determines whether the cache contains a resource identified by the given URL. If the cache does not contain a resource identified by the given URL, web browser application 302 requests the resource from a server associated with the given URL. If the cache contains a resource identified by the given URL, web browser application 302 returns the resource in the cache instead of requesting the resource from the server associated with the URL. Consequently, the next time web browser application 302 is instructed to retrieve a resource identified by the URL identifying the control surface resource, web browser application 302 retrieves the control surface resource from the cache instead of requesting the control surface resource from server computing system 106. As mentioned above, the control surface resource URL includes a hash parameter that is dependent on the extension definition files installed at server computing system 106. Furthermore, as mentioned above, server computing system 106 includes the updated control surface resource URL in the web page. Consequently, when web browser application 302 requests the web page, web browser application 302 determines that the cache does not contain a resource identified by the updated control surface resource URL and requests the control surface resource from server computing system 106. In this way, server computing system 106 effectively causes web browser application 302 to request the control resurface resource from server computing system 106 whenever changes occur to the extension definition files installed at server computing system 106.

When web browser application 302 receives the control surface resource, the surface request script causes web browser application 302 to update the web page to include a control surface based on the control surface resource (718). In one example implementation, the control surface resource is a JSON file. In this example implementation, the surface request script parses the JSON file and uses the resulting parse tree to generate HTML code. In this example implementation, the surface request script then builds one or more Document Object Model (DOM) objects and adds these DOM objects to the web page. In example implementation and/or other implementations, the surface request script adds the HTML code to the web page, thereby causing the web page to include the control surface.

In one example implementation, the HTML code defines a table structure. Each cell in the data structure contains a control element associated with a different control. Control elements may be implemented as a variety of HTML elements. For example, control elements may be implemented as paragraph elements, image elements, form elements, list elements, input elements, label elements, layer elements, link elements, option elements, select elements, button elements, applet elements, anchor elements, and/or other types of HTML elements.

Each control element is associated with a control script and may include one or more event handlers. For example, a control element defining a control may include a control script. In this example, the control script includes an on-click event handler, an on-mouseover event handler, and an on-mouseout event handler. When web browser application 302 adds a control element to the web page, web browser application 302 registers the event handlers in the control element's control script. Registering the event handlers enables the event handlers to receive events.

After updating the web page to include the control surface in step 718 or when web browser application 302 does not detect an on-load event ("NO" of 712), web browser application 302 detects whether an on-click event on a control element has occurred (720). If an on-click event on a control element has occurred ("YES" of 720), web browser application 302 executes the on-click event handler of the control script of the control element (722). An on-click event handler may cause web browser application 302 to perform a variety of activities. For example, the control surface may include a plurality of tab controls. When the user clicks on a control element defining one of the tab controls, web browser application 302 executes an on-click event handler for the control element. In this example, the on-click event handler causes the web browser application 302 to send a resource request to server computing system 106. In this example, the resource request indicates a resource identifier of the tab. When server computing system 106 receives this resource request, server computing system 106 may perform operations 400, 500, and 600 illustrated in FIGS. 4, 5, and 6. When host application 204 generates the initial parse tree at step 508 (FIG. 5), host application 204 only includes in the parse tree nodes representing a tab node representing the tab and descendent nodes of the tab node. In this example, when web browser application 302 receives the resulting resource, the on-click event handler updates the web page based on the resulting resource. In this way, the web page displays the tab.

In a second example, the user clicks on a menu control. In this second example, the on-click event handler associated with the menu control updates the web page to display a menu containing a plurality of menu controls. Each menu control in the plurality of menu controls is associated with a different functionality. The on-click event handler uses the properties bag generated by the property polling script to determine which of the menu controls should be enabled and which of the menu controls should be disabled. In one example implementation, disabled menu controls may have a different appearance than enabled menu controls.

If web browser application 302 determines that no on-click event has occurred ("NO" of 720), web browser application 302 determines whether an on-mouseover event has occurred on a control element (724). If an on-mouseover event has occurred ("YES" of 724), web browser application 302 executes an on-mouseover event handler of the control script of the control element (726). The on-mouseover event handler may cause web browser application 302 to perform a variety of activities. For example, the on-mouseover event handler of the control script of an image control element may change the image from a first image to a second image. In this example, changing the image control element from the first image to the second image visually indicates to the user that the functionality associated with image control element will be invoked if the user presently presses the primary mouse button.

If web browser application 302 determines that no on-mouseover event has occurred ("NO" of 724), web browser application 302 determines whether an on-mouseout event has occurred on a control element (728). If web browser application 302 determines that an on-mouseout event has occurred on the control element ("YES" of 728), web browser application 302 executes an on-mouseout event handler of the control script of the control element (730). The on-mouseout event handler may cause web browser application 302 to perform a variety of activities. Continuing the example of the previous paragraph, the on-mouseout event handler may cause of the control script of an image control element to change the image from the second image to the first image. In this example, changing the image from the second image to the first image visually indicates to the user that the functionality associated with the control element will not be invoked if the user presently presses the primary mouse button.

Figure 8:
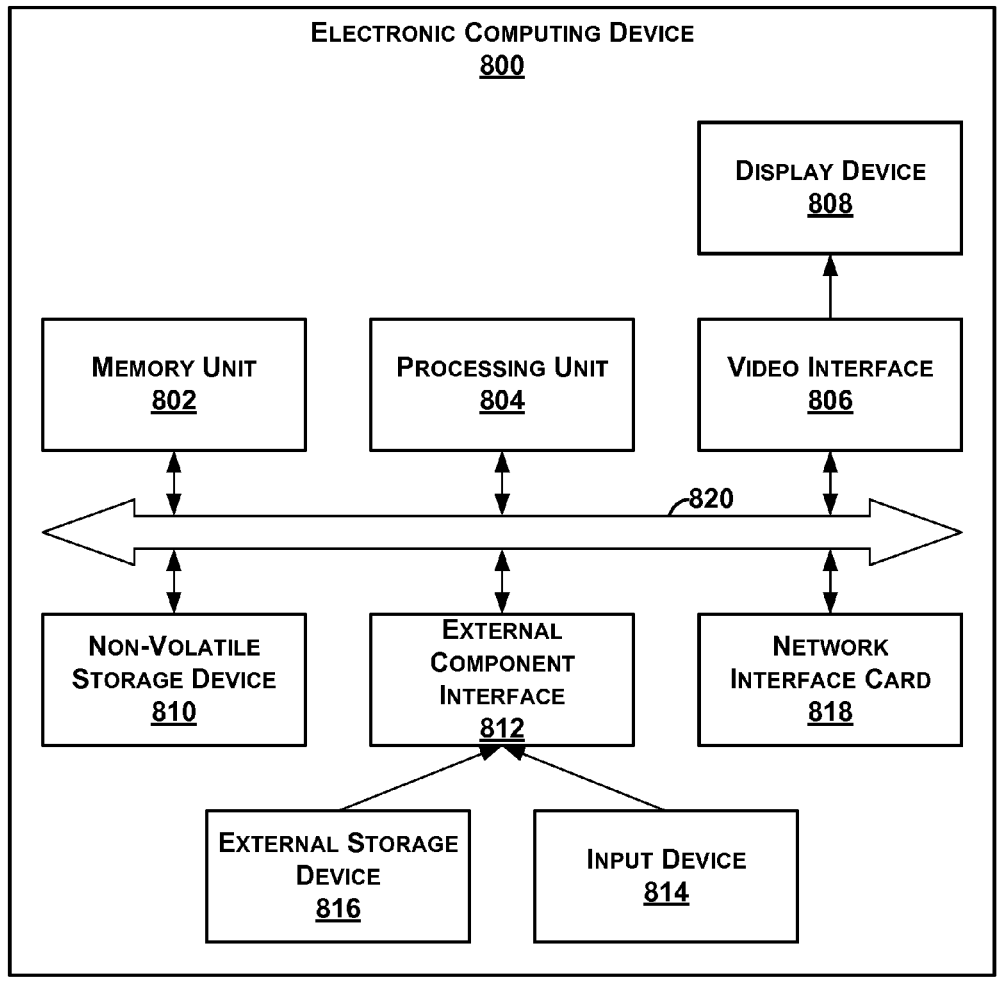
FIG. 8 is a block diagram illustrating example physical components of an electronic computing device.

FIG. 8 is a block diagram illustrating example physical components of an electronic computing device 800. As illustrated in the example of FIG. 8, electronic computing device 800 comprises a memory unit 802. Memory unit 802 is a computer-readable data storage medium capable of storing data and/or instructions. Memory unit 802 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 800 comprises a processing unit 804. As mentioned above, a processing unit is a set of one or more physical electronic integrated circuits that are capable of executing instructions. In a first example, processing unit 804 may execute software instructions that cause electronic computing device 800 to provide specific functionality. In this first example, processing unit 804 may be implemented as one or more processing cores and/or as one or more separate microprocessors. For instance, in this first example, processing unit 804 may be implemented as one or more Intel Core 2 microprocessors. Processing unit 804 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 804 may be implemented as an ASIC that provides specific functionality. In a third example, processing unit 804 may provide specific functionality by using an ASIC and by executing software instructions.

Electronic computing device 800 also comprises a video interface 806. Video interface 806 enables electronic computing device 800 to output video information to a display device 808. Display device 808 may be a variety of different types of display devices. For instance, display device 808 may be a cathode-ray tube display, an LCD display panel, a plasma screen display panel, a touch-sensitive display panel, a LED array, or another type of display device.

In addition, electronic computing device 800 includes a non-volatile storage device 810. Non-volatile storage device 810 is a computer-readable data storage medium that is capable of storing data and/or instructions. Non-volatile storage device 810 may be a variety of different types of non-volatile storage devices. For example, non-volatile storage device 810 may be one or more hard disk drives, magnetic tape drives, CD-ROM drives, DVD-ROM drives, Blu-Ray disc drives, or other types of non-volatile storage devices.

Electronic computing device 800 also includes an external component interface 812 that enables electronic computing device 800 to communicate with external components. As illustrated in the example of FIG. 8, external component interface 812 enables electronic computing device 800 to communicate with an input device 814 and an external storage device 816. In one implementation of electronic computing device 800, external component interface 812 is a Universal Serial Bus (USB) interface. In other implementations of electronic computing device 800, electronic computing device 800 may include another type of interface that enables electronic computing device 800 to communicate with input devices and/or output devices. For instance, electronic computing device 800 may include a PS/2 interface. Input device 814 may be a variety of different types of devices including, but not limited to, keyboards, mice, trackballs, stylus input devices, touch pads, touch-sensitive display screens, or other types of input devices. External storage device 816 may be a variety of different types of computer-readable data storage media including magnetic tape, flash memory modules, magnetic disk drives, optical disc drives, and other computer-readable data storage media.

In addition, electronic computing device 800 includes a network interface card 818 that enables electronic computing device 800 to send data to and receive data from an electronic communication network. Network interface card 818 may be a variety of different types of network interface. For example, network interface card 818 may be an Ethernet interface, a token-ring network interface, a fiber optic network interface, a wireless network interface (e.g., WiFi, WiMax, etc.), or another type of network interface.

Electronic computing device 800 also includes a communications medium 820. Communications medium 820 facilitates communication among the various components of electronic computing device 800. Communications medium 820 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Electronic computing device 800 includes several computer-readable data storage media (i.e., memory unit 802, non-volatile storage device 810, and external storage device 816). Together, these computer-readable storage media may constitute a single data storage system. As discussed above, a data storage system is a set of one or more computer-readable data storage mediums. This data storage system may store instructions executable by processing unit 804. Activities described in the above description may result from the execution of the instructions stored on this data storage system. Thus, when this description says that a particular logical module performs a particular activity, such a statement may be interpreted to mean that instructions of the logical module, when executed by processing unit 804, cause electronic computing device 800 to perform the activity. In other words, when this description says that a particular logical module performs a particular activity, a reader may interpret such a statement to mean that the instructions configure electronic computing device 800 such that electronic computing device 800 performs the particular activity.

The techniques of this disclosure may be realized in many ways. For example, the techniques of this disclosure may be realized as a method for implementing a customized control surface. The method comprises automatically retrieving, by a server computing system, a base definition file, the base definition file comprising a first hierarchical set of elements, the first hierarchical set of elements defining a default control surface, the default control surface comprising a plurality of user-selectable controls. The method also comprises automatically retrieving, by the server computing system, an extension definition file, the extension definition file comprising a second hierarchical set of elements, the second hierarchical set of elements defining a customized control surface based on the default control surface. In addition, the method comprises automatically generating, by the server computing system, a modified version of the base definition file in which each element in the base definition file having an identifier corresponding to an identifier of an element in the extension definition file is modified in a way indicated by the element in the extension definition file. Furthermore, the method comprises automatically using, by the server computing system, the modified version of the base definition file to generate a requested control surface resource. Moreover, the method comprises automatically sending, by the server computing system, the control surface resource to a client computing system, the client computing system configured to use the control surface resource to present the customizable control surface in a user interface.

In another example, the techniques of this disclosure may be realized as an electronic computing system comprising a processing unit and a data storage system. The data storage system stores a base definition file comprising a first hierarchical set of elements, the first hierarchical set of elements defining a default control surface, the default control surface comprising a plurality of user-selectable controls. The data storage system also stores an extension definition file comprising a second hierarchical set of elements, the second hierarchical set of elements defining a customized control surface based on the default control surface. In addition, the data storage system stores computer-executable instructions that, when executed by the processing unit, cause the electronic computing system to receive a resource request sent by a client computing system, the resource request specifying a resource identifier of a control surface resource. The instructions also cause the electronic computing system to automatically identify, in response to receiving the resource request, the extension definition file from among a plurality of extension definition files. In addition, the instructions cause the electronic computing system to automatically generate a modified version of the base definition file in which each element in the base definition file having an identifier corresponding to an identifier of an element in the extension definition file is modified in a way indicated by the element in the extension definition file. Moreover, the instructions cause the electronic computing system to automatically use the modified version of the base definition file to generate the control surface resource. In addition, the instructions cause the electronic computing system to automatically send the control surface resource to the client computing system, the client computing system configured to use the control surface resource to present the customized control surface in a user interface.

In another example, the techniques of this disclosure may be realized as a computer-readable medium comprising computer-executable instructions that, when executed by a processing unit of an electronic computing system, cause the electronic computing system store a base definition file comprising a first hierarchical set of elements, the first hierarchical set of elements defining a default control surface, the default control surface comprising a plurality of user-selectable controls. The instructions also cause the electronic computing system to store a plurality of extension definition files, each extension definition file in the plurality of extension definition files comprising hierarchical sets of elements defining customized control surfaces based on the default control surface, the plurality of extension definition files including an applicable extension definition file comprising an applicable hierarchical set of elements, the applicable hierarchical set of elements defining an applicable customized control surface based on the default control surface. In addition, the instructions cause the electronic computing system to receiving, a web page request from a client computing system via an electronic communication network, the web page request including a resource identifier of a web page. Furthermore, the instructions send, in response to the web page request, the web page to the client computing system via the electronic communication network, the web page including scripts configuring the client computing system to send a resource request to the electronic computing system. In addition, the instructions cause the electronic computing system to receive the resource request from the client computing system via an electronic communication network, the resource request specifying a resource identifier of the control surface resource. The instructions also cause the electronic computing system to automatically identify, in response to receiving the resource request, the applicable extension definition file from among the plurality of extension definition files. Moreover, the instructions cause the electronic computing system to automatically generate a base parse tree, each node in the base parse tree representing an element in the first hierarchical set of elements, each node in the base parse tree linked together to represent parent-child relationships among the elements in the first hierarchical set of elements. In addition, the instructions cause the electronic computing system to automatically generate an extension parse tree, the extension parse tree comprising a second set of nodes, each node in the extension parse tree representing an element in the applicable hierarchical set of elements, each node in the extension parse tree linked together to represent parent-child relationships among the elements in the applicable hierarchical set of elements. The instructions also cause the electronic computing system to automatically push a reference to a root node of the base parse tree onto a node stack. Furthermore, the instructions cause the electronic computing system to automatically determine whether the node stack is empty. In addition, the instructions cause the electronic computing system to automatically pop from the node stack a reference to a current node in the base parse tree, the electronic computing system automatically popping the reference to the current node in response to determining that the node stack is not empty. In addition, the instructions cause the electronic computing system to automatically determine whether an identifier of the current node corresponds to an identifier of a corresponding node in the extension parse tree. The instructions also cause the electronic computing system to automatically push, in response to determining that the identifier of the current node does not correspond to an identifier of any node in the extension parse tree, references to each child node of the current node onto the node stack. The instructions also cause the electronic computing system to automatically determine, in response to determining that the identifier of the current node corresponds to the identifier of the corresponding node, whether an action indicated by the corresponding node is an add child action. In addition, the instructions cause the electronic computing system to automatically add, in response to determining that the action indicated by the corresponding node is an add child action, a subtree of the corresponding node to the base parse tree as a child of the current node. Moreover, the instructions cause the electronic computing system to push, in response to determining that the action indicated by the corresponding node is an add child action, references to each child node of the current node onto the node stack. In addition, the instructions cause the electronic computing system to automatically determine, in response to determining that the identifier of the current node corresponds to the identifier of the corresponding node, whether the action indicated by the corresponding node is a remove action. The instructions also cause the electronic computing system to automatically remove, in response to determining that the action indicated by the corresponding node is a remove action, a subtree of the current node from the base parse tree. Moreover, the instructions cause the electronic computing system to automatically determine, in response to determining that the identifier of the current node corresponds to the identifier of the corresponding node, whether the action indicated by the corresponding node is a replace action. In addition, the instructions cause the electronic computing system to automatically replace, in response to determining that the action indicated by the corresponding node is a replace action, the current node with the corresponding node without replacing the subtree of the current node with the subtree of the corresponding node. In addition, the instructions cause the electronic computing system to push, in response to determining that the action indicated by the corresponding node is a replace action, references to each child node of the current node onto the node stack. Moreover, the instructions cause the electronic computing system to automatically determine, in response to determining that the identifier of the current node corresponds to the identifier of the corresponding node, whether the action indicated by the corresponding node is a replace subtree action. In addition, the instructions cause the electronic computing system to automatically replace, in response to determining that the action indicated by the corresponding node is a replace subtree action, the subtree of the current node with the subtree of the corresponding node. The instructions also cause the electronic computing system to automatically push, in response to determining that the action indicated by the corresponding node is a replace subtree action, references to each child node of the corresponding node onto the node stack. In addition, the instructions cause the electronic computing system to automatically use, in response to determining that the node stack is empty, the base parse tree to generate the control surface resource. Furthermore, the instructions cause the electronic computing system to automatically send the control surface resource to the client computing system, the client computing system configured to use the control surface resource to present the customized control surface in the web page.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of implementing a customized control surface, the method comprising:
    automatically retrieving, by a server computing system, a base definition file, the base definition file comprising a first hierarchical set of elements, the first hierarchical set of elements defining a default control surface, the default control surface comprising a plurality of user-selectable controls, wherein the first hierarchical set of elements defines the default control surface such that the default control surface comprises a plurality of tabs, each tab in the plurality of tabs comprising a tab title and a control area containing a plurality of controls, the plurality of controls being divided into a plurality of control groups, each control group comprising a visual grouping of logically associated controls, the logically associated controls comprising button controls, drop-down box controls, check box controls and menu controls, the plurality of controls in a first tab in the plurality of tabs comprising controls for managing one or more posts in the default control surface, the plurality of controls in a second tab in the plurality of tabs comprising controls for managing one or more comments in the default control surface;
    automatically retrieving, by the server computing system, an extension definition file, the extension definition file comprising a second hierarchical set of elements, the second hierarchical set of elements defining a customized control surface based on the default control surface;
    automatically generating, by the server computing system, a modified version of the base definition file in which each element in the base definition file having an identifier corresponding to an identifier of an element in the extension definition file is modified in a way indicated by the element in the extension definition file;
    automatically using, by the server computing system, the modified version of the base definition file to generate a requested control surface resource; and
    automatically sending, by the server computing system, the control surface resource to a client computing system, the client computing system configured to use the control surface resource to present the customizable control surface in a user interface.

2. The method of claim 1,
    wherein the method further comprises receiving, by the server computing system, a resource request sent by the client computing system, the resource request specifying a resource identifier of the control surface resource;
    wherein automatically retrieving the base definition file comprises automatically retrieving, by the server computing system, the base definition file in response to receiving the resource request.

3. The method of claim 2, further comprising automatically identifying, by the server computing system, the extension definition file from among a plurality of extension definition files.

4. The method of claim 3,
    wherein the user interface is a web page; and
    wherein identifying the extension definition file comprises identifying the extension definition file from among the plurality of extension definition files based on association of the extension definition file with a website that includes the web page.

5. The method of claim 3,
    wherein the extension definition file is a first extension definition file; and
    wherein the method further comprises: automatically retrieving, by the server computing system, a second extension definition file in the plurality of extension definition files, the second extension definition file comprising a third hierarchical set of elements, the third hierarchical set of elements defining an intermediate customized control surface based on the default control surface; and
    wherein automatically generating the modified version of the base definition file comprises:
        automatically generating an intermediate version of the base definition file in which each element in the base definition file having an identifier corresponding to an identifier of an element in the first extension definition file is modified in a way indicated by the element in the first extension definition file; and
        automatically generating the modified version of the base definition file in which each element in the intermediate version of the base definition file having an identifier corresponding to an identifier of an element in the second extension definition file is modified in a way indicated by the element in the second extension definition file.

6. The method of claim 2,
    wherein the user interface is a web page; and wherein the method further comprises:
receiving, at the server computing system, a web page request from the client computing system, the web page request including a resource identifier of the web page; and
automatically sending, by the server computing system in response to the web page request, the web page to the client computing system, the web page including scripts configuring the client computing system to send the resource request to the server computing system.

7. The method of claim 6, wherein sending the web page comprises:
automatically sending, by the server computing system, a property polling script that configures the client computing system to poll properties of objects in the web page to build a property bag;
automatically sending, by the server computing system, a script that uses the property bag to enable or disable controls in the customized control surface.

8. The method of claim 1, wherein the base definition file and the extension definition file are extensible markup language (XML) files.

9. The method of claim 1, wherein the control surface resource is a JavaScript Object Notation (JSON) file.

10. The method of claim 1, wherein automatically generating the modified version of the base definition file comprises:
automatically generating, by the server computing system, a base parse tree, the base parse tree being the modified version of the base definition file, the base parse tree comprising a first set of nodes, each node in the base parse tree representing an element in the first hierarchical set of elements, each node in the base parse tree linked together to represent parent-child relationships among the elements in the first hierarchical set of elements;
automatically generating, by the server computing system, an extension parse tree, the extension parse tree comprising a second set of nodes, each node in the extension parse tree representing an element in the second hierarchical set of elements, each node in the extension parse tree linked together to represent parent-child relationships among the elements in the second hierarchical set of elements;
automatically pushing, by the server computing system, a reference to a root node of the base parse tree onto a node stack;
automatically determining, by the server computing system, whether the node stack is empty;
automatically popping, by the server computing system, from the node stack a reference to a current node in the base parse tree, the server computing system automatically popping the reference to the current node in response to determining that the node stack is not empty;
automatically determining, by the server computing system, whether an identifier of the current node corresponds to an identifier of a corresponding node in the extension parse tree;
automatically pushing, by the server computing system in response to determining that the identifier of the current node does not correspond to an identifier of any node in the extension parse tree, references to each child node of the current node onto the node stack;
automatically determining, by the server computing system in response to determining that the identifier of the current node corresponds to the identifier of the corresponding node, whether an action indicated by the corresponding node is an add child action, the add child action being determined based on whether an action property of the corresponding node specifies the add child action;
automatically adding, by the server computing system in response to determining that the action indicated by the corresponding node is an add child action, a subtree of the corresponding node to the base parse tree as a child of the current node and pushing references to each child node of the current node onto the node stack;
automatically determining, by the server computing system in response to determining that the identifier of the current node corresponds to the identifier of the corresponding node, whether the action indicated by the corresponding node is a remove action;
automatically removing, by the server computing system in response to determining that the action indicated by the corresponding node is a remove action, a subtree of the current node from the base parse tree;
automatically determining, by the server computing system in response to determining that the identifier of the current node corresponds to the identifier of the corresponding node, whether the action indicated by the corresponding node is a replace action;
automatically replacing, by the server computing system in response to determining that the action indicated by the corresponding node is a replace action, the current node with the corresponding node without replacing the subtree of the current node with the subtree of the corresponding node and pushing references to each child node of the current node onto the node stack;
automatically determining, by the server computing system in response to determining that the identifier of the current node corresponds to the identifier of the corresponding node, whether the action indicated by the corresponding node is a replace subtree action;
automatically replacing, by the server computing system in response to determining that the action indicated by the corresponding node is a replace subtree action, the subtree of the current node with the subtree of the corresponding node and pushing references to each child node of the corresponding node onto the node stack; and
automatically using, by the server computing system in response to determining that the node stack is empty, the base parse tree to generate the control surface resource.

11. The method of claim 1, wherein the control surface resource is a JSON file specifying controls in one of the tabs.

12. The method of claim 1, the method further comprising: adding a legacy extension tab to the customized control surface, the legacy extension tab being a tab within the customized control surface, the legacy extension tab including a control added using another control surface editing system.

13. The method of claim 1, wherein the customized control surface includes a user-selectable control not included in the default control surface.

14. An electronic computing system comprising:
a processing unit; and
a data storage system storing:
a base definition file comprising a first hierarchical set of elements, the first hierarchical set of elements defining a default control surface, the default control surface comprising a plurality of user-selectable controls, wherein the first hierarchical set of elements defines the default control surface such that the default control surface comprises a plurality of tabs, each tab in the plurality of tabs comprising a tab title and a control area containing a plurality of controls, the plurality of controls being divided into a plurality of control groups, each control group comprising a visual grouping of logically associated controls, the logically associated controls comprising button controls, drop-down box controls, check box controls and menu controls, the plurality of controls in a first tab in the plurality of tabs comprising controls for managing one or more posts in the default control surface, the plurality of controls in a second tab in the plurality of tabs comprising controls for managing one or more comments in the default control surface, and the first hierarchical set of elements defining a positioning of the user-selectable controls on each of the plurality of tabs;

an extension definition file comprising a second hierarchical set of elements, the second hierarchical set of elements defining a customized control surface based on the default control surface;

computer-executable instructions that, when executed by the processing unit, cause the electronic computing system to:

receive a resource request sent by a client computing system, the resource request specifying a resource identifier of a control surface resource;

automatically identify, in response to receiving the resource request, the extension definition file from among a plurality of extension definition files;

automatically generate a modified version of the base definition file in which each element in the base definition file having an identifier corresponding to an identifier of an element in the extension definition file is modified in a way indicated by the element in the extension definition file;

automatically use the modified version of the base definition file to generate the control surface resource; and automatically send the control surface resource to the client computing system, the client computing system configured to use the control surface resource to present the customized control surface in a user interfaces wherein the user interface is a web page; and wherein the instructions that cause the electronic computing system to automatically send the control surface resource cause the electronic computing system to:

send a property polling script that configures the client computing system to periodically poll properties of objects in the web page to build a property bag; and send a script that uses the property bag to enable or disable controls in the customized control surface.

15. The electronic computing system of claim 14, wherein the base definition file and the extension definition file are extensible markup language (XML) files and wherein the control surface resource is a JavaScript Object Notation (JSON) file.

16. The electronic computing system of claim 14, wherein the instructions that cause the electronic computing system to automatically generate the modified version of the base definition file cause the electronic computing system to:

automatically generate a base parse tree, the base parse tree being the modified version of the base definition file, the base parse tree comprising a first set of nodes, each node in the base parse tree representing an element in the first hierarchical set of elements, each node in the base parse tree linked together to represent parent-child relationships among the elements in the first hierarchical set of elements;

automatically generate an extension parse tree, the extension parse tree comprising a second set of nodes, each node in the extension parse tree representing an element in the second hierarchical set of elements, each node in the extension parse tree linked together to represent parent-child relationships among the elements in the second hierarchical set of elements;

automatically push a reference to a root node of the base parse tree onto a node stack;

automatically determine whether the node stack is empty;

automatically pop from the node stack a reference to a current node in the base parse tree, the electronic computing system automatically popping the reference to the current node in response to determining that the node stack is not empty;

automatically determine whether an identifier of the current node corresponds to an identifier of a corresponding node in the extension parse tree;

automatically push, in response to determining that the identifier of the current node does not correspond to an identifier of any node in the extension parse tree, references to each child node of the current node onto the node stack;

automatically determine, in response to determining that the identifier of the current node corresponds to the identifier of the corresponding node, whether an action indicated by the corresponding node is an add child action;

automatically add, in response to determining that the action indicated by the corresponding node is an add child action, a subtree of the corresponding node to the base parse tree as a child of the current node;

push, in response to determining that the action indicated by the corresponding node is an add child action, references to each child node of the current node onto the node stack;

automatically determine, in response to determining that the identifier of the current node corresponds to the identifier of the corresponding node, whether the action indicated by the corresponding node is a remove action;

automatically remove, in response to determining that the action indicated by the corresponding node is a remove action, a subtree of the current node from the base parse tree;

automatically determine, in response to determining that the identifier of the current node corresponds to the identifier of the corresponding node, whether the action indicated by the corresponding node is a replace action;

automatically replace, in response to determining that the action indicated by the corresponding node is a replace action, the current node with the corresponding node without replacing the subtree of the current node with the subtree of the corresponding node;

push, in response to determining that the action indicated by the corresponding node is a replace action, references to each child node of the current node onto the node stack;

automatically determine, in response to determining that the identifier of the current node corresponds to the identifier of the corresponding node, whether the action indicated by the corresponding node is a replace subtree action;

automatically replace, in response to determining that the action indicated by the corresponding node is a replace subtree action, the subtree of the current node with the subtree of the corresponding node;

push, in response to determining that the action indicated by the corresponding node is a replace subtree action references to each child node of the corresponding node onto the node stack; and automatically use, in response to determining that the node stack is empty, the base parse tree to generate the control surface resource.

17. The electronic computing system of claim 14, wherein the default control surface includes a user-selectable control not included in the customized control surface.

18. A computer-readable data storage device storing instructions that, when executed by an electronic computing system, cause the electronic computing system to:

store a base definition file comprising a first hierarchical set of elements, the first hierarchical set of elements defining a default control surface such that the default control surface comprises a plurality of tabs, each tab in the plurality of tabs comprising a tab title and a control area containing a plurality of controls, the plurality of controls being divided into a plurality of control groups, each control group comprising a visual grouping of logically associated controls, the logically associated controls comprising button controls, drop-down box controls, check box controls and menu controls, the plurality of controls in a first tab in the plurality of tabs comprising controls for managing one or more posts in the default control surface, the plurality of controls in a second tab in the plurality of tabs comprising controls for managing one or more comments in the default control surface;

store a plurality of extension definition files, each extension definition file in the plurality of extension definition files comprising hierarchical sets of elements defining customized control surfaces based on the default control surface, the plurality of extension definition files including an applicable extension definition file comprising an applicable hierarchical set of elements, the applicable hierarchical set of elements defining an applicable customized control surface based on the default control surface;

receiving, a web page request from a client computing system via an electronic communication network, the web page request including a resource identifier of a web page;

send, in response to the web page request, the web page to the client computing system via the electronic communication network, the web page including scripts configuring the client computing system to send a resource request to the electronic computing system;

receive the resource request from the client computing system via an electronic communication network, the resource request specifying a resource identifier of the control surface resource;

automatically identify, in response to receiving the resource request, the applicable extension definition file from among the plurality of extension definition files;

automatically generate a base parse tree, each node in the base parse tree representing an element in the first hierarchical set of elements, each node in the base parse tree linked together to represent parent-child relationships among the elements in the first hierarchical set of elements;

automatically generate an extension parse tree, the extension parse tree comprising a second set of nodes, each node in the extension parse tree representing an element in the applicable hierarchical set of elements, each node in the extension parse tree linked together to represent parent-child relationships among the elements in the applicable hierarchical set of elements;

automatically push a reference to a root node of the base parse tree onto a node stack;

automatically determine whether the node stack is empty;

automatically pop from the node stack a reference to a current node in the base parse tree, the electronic computing system automatically popping the reference to the current node in response to determining that the node stack is not empty;

automatically determine whether an identifier of the current node corresponds to an identifier of a corresponding node in the extension parse tree;

automatically push, in response to determining that the identifier of the current node does not correspond to an identifier of any node in the extension parse tree, references to each child node of the current node onto the node stack;

automatically determine, in response to determining that the identifier of the current node corresponds to the identifier of the corresponding node, whether an action indicated by the corresponding node is an add child action;

automatically add, in response to determining that the action indicated by the corresponding node is an add child action, a subtree of the corresponding node to the base parse tree as a child of the current node;

push, in response to determining that the action indicated by the corresponding node is an add child action, references to each child node of the current node onto the node stack;

automatically determine, in response to determining that the identifier of the current node corresponds to the identifier of the corresponding node, whether the action indicated by the corresponding node is a remove action;

automatically remove, in response to determining that the action indicated by the corresponding node is a remove action, a subtree of the current node from the base parse tree;

automatically determine, in response to determining that the identifier of the current node corresponds to the identifier of the corresponding node, whether the action indicated by the corresponding node is a replace action;

automatically replace, in response to determining that the action indicated by the corresponding node is a replace action, the current node with the corresponding node without replacing the subtree of the current node with the subtree of the corresponding node;

push, in response to determining that the action indicated by the corresponding node is a replace action, references to each child node of the current node onto the node stack;

automatically determine, in response to determining that the identifier of the current node corresponds to the identifier of the corresponding node, whether the action indicated by the corresponding node is a replace subtree action;

automatically replace, in response to determining that the action indicated by the corresponding node is a replace subtree action, the subtree of the current node with the subtree of the corresponding node;

automatically push, in response to determining that the action indicated by the corresponding node is a replace subtree action, references to each child node of the corresponding node onto the node stack;

automatically use, in response to determining that the node stack is empty, the base parse tree to generate the control surface resource; and automatically send the control surface resource to the client computing system, the client computing system configured to use the control surface resource to present the customized control surface in the web page.

* * * * *